United States Patent
Li et al.

(10) Patent No.: US 11,018,740 B2
(45) Date of Patent: May 25, 2021

(54) METHOD FOR ANTENNA PORT INDICATION AND APPARATUS

(71) Applicant: Huawei Technologies Co., Ltd., Shenzhen (CN)

(72) Inventors: Zhongfeng Li, Munich (DE); Ning Wu, Shanghai (CN); Yongzhao Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/141,331

(22) Filed: Sep. 25, 2018

(65) Prior Publication Data

US 2019/0028164 A1    Jan. 24, 2019

Related U.S. Application Data

(63) Continuation of application No. PCT/CN2017/078311, filed on Mar. 27, 2017.

(30) Foreign Application Priority Data

Mar. 25, 2016  (CN) .......................... 201610179119.9

(51) Int. Cl.
  *H04B 7/06*  (2006.01)
  *H04W 72/04*  (2009.01)
  (Continued)

(52) U.S. Cl.
  CPC ............. *H04B 7/06* (2013.01); *H04B 7/0665* (2013.01); *H04W 72/042* (2013.01);
  (Continued)

(58) Field of Classification Search
  CPC ..... H04B 7/06; H04B 7/0665; H04W 72/042; H04W 72/0486; H04W 72/121; H04W 72/1252; H04W 72/08
  See application file for complete search history.

(56) References Cited

U.S. PATENT DOCUMENTS 10,433,316 B2 * 10/2019 Garcia ...................... H04B 7/04
2011/0176634 A1 * 7/2011 Yoon ..................... H04L 5/0023
                                                                  375/295
(Continued)

FOREIGN PATENT DOCUMENTS

CN         101841936 A       9/2010
CN         102158302 A       8/2011
                      (Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.0.0, pp. 1-121, 3rd Generation Partnership Project, Valbonne, France (Dec. 2015).
(Continued)

*Primary Examiner* — Mounir Moutaouakil
(74) *Attorney, Agent, or Firm* — Leydig, Voit & Mayer, Ltd.

(57) ABSTRACT

The application relates to a method for antenna port indication. A terminal receives information indicating an antenna port set of a pilot from a base station. The antenna port set is used for a resource block (RB) set and the pilot is used for data demodulation. And the terminal determines the antenna port set based on the received information. By implementing the solution in the application, transmission resource utilization is improved.

16 Claims, 9 Drawing Sheets

(51) Int. Cl.
*H04W 72/08* (2009.01)
*H04W 72/12* (2009.01)

(52) U.S. Cl.
CPC ....... *H04W 72/0486* (2013.01); *H04W 72/08* (2013.01); *H04W 72/121* (2013.01); *H04W 72/1252* (2013.01)

(56) References Cited

U.S. PATENT DOCUMENTS

| | | |
|---|---|---|
| 2013/0070732 A1 | 3/2013 | Noh et al. |
| 2014/0133336 A1 | 5/2014 | Park et al. |
| 2015/0043466 A1 | 2/2015 | Yoshida et al. |
| 2015/0173052 A1 | 6/2015 | Zhang |
| 2016/0036542 A1 | 2/2016 | Gong et al. |
| 2016/0302175 A1* | 10/2016 | Blankenship ........... H04W 4/70 |
| 2017/0111134 A1 | 4/2017 | Lee et al. |
| 2018/0262314 A1 | 9/2018 | Xia et al. |

FOREIGN PATENT DOCUMENTS

| | | | | |
|---|---|---|---|---|
| CN | 102474328 A | 5/2012 | | |
| CN | 103259583 A | 8/2013 | | |
| CN | 103581090 A | 2/2014 | | |
| CN | 203661061 U | 6/2014 | | |
| CN | 104079329 A | 10/2014 | | |
| CN | 104105120 A | 10/2014 | | |
| EP | 2424137 A1 * | 2/2012 | ........... | H04B 17/345 |
| JP | 2011193467 A | 9/2011 | | |
| JP | 2013520130 A | 5/2013 | | |
| WO | 2013140732 A1 | 9/2013 | | |
| WO | 2014101058 A1 | 7/2014 | | |

OTHER PUBLICATIONS

CN/201780019791.4, Notice of Allowance/Search Report, dated Feb. 18, 2021.

* cited by examiner

METHOD FOR ANTENNA PORT INDICATION AND APPARATUS

CROSS-REFERENCE TO RELATED APPLICATIONS

This application is a continuation of International Application No. PCT/CN2017/078311, filed on Mar. 27, 2017, which claims priority to Chinese Patent Application No. 201610179119.9, filed on Mar. 25, 2016. The disclosures of the aforementioned applications are hereby incorporated by reference in their entireties.

TECHNICAL FIELD

The present application relates to the communications field, and in particular, to a method for antenna port indication and an apparatus.

BACKGROUND

A multiple-antenna technology is an important technology in a Long Term Evolution (LTE) system. The multiple-antenna technology is widely applied because the multiple-antenna technology can be used to improve resource utilization without extra consumption of a time-frequency resource. In the multiple-antenna technology, a base station can support a plurality of antenna ports (e.g., eight or sixteen), and support transmission at a plurality of layers (e.g., four layers or eight layers).

Communication channels between the base station and different user equipments may have different channel quality. Therefore, the different user equipments served by the base station may support different quantities of transport layers in a downlink direction. In specific implementation, the base station needs to indicate an antenna port to user equipment based on a quantity of transport layers supported by the user equipment in the downlink direction.

In an antenna port indication method, a base station indicates only an antenna port used by user equipment to the user equipment. Therefore, because the user equipment can learn only the antenna port used by the user equipment itself, the user equipment can receive a data symbol only on a transmission resource that is used to send a data symbol and that is common to all user equipments served by the base station, but cannot receive a data symbol on another transmission resource. Consequently, transmission resource utilization is relatively low.

SUMMARY

Embodiments of the present invention provide an antenna port indication method and an apparatus, so that a data symbol can be sent on a transmission resource other than a transmission resource that is used to send a data symbol and that is common to all user equipments served by a base station, thereby improving transmission resource utilization.

To achieve the foregoing objective, the following technical solutions are used in the embodiments of the present invention.

According to a first aspect, an embodiment of the present invention provides an antenna port indication method, including: determining, by a base station, information about an antenna port used for a resource block RB set used by target user equipment; and sending, to the target user equipment, a message carrying the information that is used to indicate the antenna port used for the RB set, where the antenna port used for the RB set is an antenna port used by all user equipments that receive a signal on each RB in the RB set.

According to a second aspect, an embodiment of the present invention provides a base station, including a determining unit and a sending unit. The determining unit is configured to determine information about an antenna port used for an RB set used by target user equipment. The sending unit is configured to send, to the target user equipment, a message carrying the information that is used to indicate the antenna port used for the RB set. The antenna port used for the RB set is an antenna port used by all user equipments that receive a signal on each RB in the RB set.

According to the technical solution provided in the first aspect or the second aspect, the user equipment can learn the antenna port used for the RB set used by the user equipment. Therefore, the user equipment can effectively use a transmission resource corresponding to an antenna port unused for the RB set. In comparison with the prior art, a data symbol can be sent on a transmission resource other than a transmission resource that is used to send a data symbol and that is common to all user equipments served by the base station, thereby improving transmission resource utilization.

Optionally, the information about the antenna port used for the RB set may include an antenna port (namely, a largest antenna port) with a largest number or an antenna port (namely, a smallest antenna port) with a smallest number in antenna ports used by all user equipments that receive a signal on the RB set. Alternatively, the information that is used to indicate the antenna port used for the RB set includes an identifier of an antenna port or an antenna port set used by user equipment that receives a signal on the RB set.

Optionally, according to the first aspect, the sending, by the base station to the target user equipment, a message carrying the information that is used to indicate the antenna port used for the RB set may include: sending, by the base station to the target user equipment, DCI carrying the information that is used to indicate the antenna port used for the RB set.

Correspondingly, according to the second aspect, the sending unit is specifically configured to send, to the target user equipment, DCI carrying the information that is used to indicate the antenna port used for the RB set.

In this optional implementation, the DCI in the prior art is used to carry the information that is used to indicate the antenna port used for the RB set, so that the technical effect provided above can be achieved without an increase of information exchange between the base station and the user equipment.

For example, a downlink power offset field in the DCI is used to indicate the information that is used to indicate the antenna port used for the RB set; or a field newly defined in the DCI is used to indicate the information that is used to indicate the antenna port used for the RB set. Optionally, in the implementation in which the downlink power offset field in the DCI is used to indicate the information that is used to indicate the antenna port used for the RB set, a quantity of bits occupied by the downlink power offset field is greater than or equal to 2.

Optionally, if the information that is used to indicate the antenna port used for the RB set is the largest antenna port used for the RB set, a value of a power offset field is used to indicate an antenna port with a largest number in antenna ports used for an RB used by a plurality of user equipments; or if the information that is used to indicate the antenna port used for the RB set is the smallest antenna port used for the RB set, a value of a power offset field is used to indicate an antenna port with a smallest number in antenna ports used for an RB used by a plurality of user equipments. The plurality of user equipments include the target user equipment. In this optional implementation, a quantity of bits occupied by the downlink power offset field or the newly defined field can be reduced.

Optionally, the method provided in the first aspect may further include: sending, by the base station, a data symbol to the target user equipment at an unused pilot location corresponding to an antenna port unused for the RB set. Correspondingly, the sending unit in the base station provided in the second aspect may be further configured to send a data symbol to the target user equipment at an unused pilot location corresponding to an antenna port unused for the RB set.

This optional implementation provides a specific example in which an antenna port unused for the RB set used by the target user equipment is used. Specific implementation is not limited thereto.

Based on the foregoing optional implementation, a manner of reconfiguring a value of $\rho$ is further provided in this embodiment of the present invention. For a specific process, refer to the following description.

On the basis that the power offset field is used to indicate the antenna port used for the RB set, this embodiment of the present invention further provides a method for sending a pilot symbol. Specifically, a base station sends, by using total transmit power, a pilot symbol to target user equipment at a pilot location corresponding to an antenna port used for each resource block group. The resource block group is any one of at least one resource block group to which an RB used by the target user equipment belongs, and the total transmit power is a sum of pilot transmit power at pilot locations corresponding to all antenna ports supported by the base station. For a specific implementation, refer to the following description.

Optionally, the antenna port used for the RB set is a pilot antenna port used for the RB set. In this case, the method provided in the first aspect may further include: sending, by the base station, indication information to the target user equipment. The sending unit in the base station provided in the second aspect may be further configured to send indication information to the target user equipment. The indication information is used to indicate that when sending data, the target user equipment does not occupy a resource corresponding to an antenna port that is used by user equipment other than the target user equipment and that is in the pilot antenna port used for the RB set.

According to a third aspect, an embodiment of the present invention provides an antenna port indication method, including: receiving, by user equipment, a message sent by a base station, where the message carries information that is used to indicate an antenna port used for a resource block RB used by the user equipment; and then determining, based on the message, the antenna port used for the RB set. In the third aspect or a fourth aspect, the antenna port used for the RB set is an antenna port used by all user equipments that receive a signal on each RB in the RB set.

According to the fourth aspect, an embodiment of the present invention provides user equipment, including a receiving unit and a determining unit. The receiving unit is configured to receive a message sent by a base station, where the message carries information that is used to indicate an antenna port used for a resource block RB used by the user equipment. The determining unit is configured to determine, based on the message, the antenna port used for the RB set. The antenna port used for the RB set is an antenna port used by all user equipments that receive a signal on each RB in the RB set.

Optionally, according to the third aspect, after the determining, by the user equipment based on the message, the antenna port used for the RB set, the method may further include: receiving, by the user equipment, a data symbol at an unused pilot location corresponding to an antenna port unused for the RB set.

Correspondingly, according to the fourth aspect, the receiving unit is further configured to receive a data symbol at an unused pilot location corresponding to an antenna port unused for the RB set.

Optionally, the antenna port used for the RB set is a pilot antenna port used for the RB set. In this case, the method provided in the third aspect may further include: receiving, by the user equipment, indication information sent by the base station. The receiving unit in the user equipment provided in the fourth aspect may be further configured to receive indication information sent by the base station. The indication information is used to instruct the user equipment not to, when sending data, occupy a resource corresponding to an antenna port that is used by user equipment other than the user equipment and that is in the pilot antenna port used for the RB set.

For a beneficial effect that can be achieved by any technical solution provided in the third aspect or the fourth aspect, refer to the foregoing description, and details are not described herein again.

According to a fifth aspect, an embodiment of the present invention provides a base station, and the base station has a function of implementing a base station side behavior in the method provided in any one of the foregoing aspects. The function may be implemented by using hardware, or may be implemented by hardware executing corresponding software. The hardware or software includes one or more modules corresponding to the foregoing function.

In a possible design, a structure of the base station includes a processor and a transmitter. The processor is configured to support the base station in performing a corresponding function in the foregoing method. The transmitter is configured to support communication between the base station and user equipment. The base station may further include a memory. The memory is configured to couple to the processor, and stores a program instruction and data that are required by the base station.

According to a sixth aspect, an embodiment of the present invention provides user equipment, and the user equipment has a function of implementing a user equipment side behavior in the method provided in any one of the foregoing aspects. The function may be implemented by using hardware, or may be implemented by hardware executing corresponding software. The hardware or software includes one or more modules corresponding to the foregoing function.

In a possible design, a structure of the user equipment includes a processor and a receiver. The processor is configured to support the user equipment in performing a corresponding function in the foregoing method. The receiver is configured to support communication between the user equipment and a base station. The user equipment may further include a memory. The memory is configured to couple to the processor, and stores a program instruction and data that are required by the user equipment.

In addition, an embodiment of the present invention provides a computer storage medium, configured to store a computer software instruction used by the foregoing base station, and the computer software instruction includes a program designed to execute the first aspect.

An embodiment of the present invention provides a computer storage medium, configured to store a computer software instruction used by the foregoing user equipment, and the computer software instruction includes a program designed to execute the third aspect.

It should be noted that an embodiment of the present invention further provides a technical solution to another technical problem. Details are as follows:

A multiple-antenna technology is an important technology in an LTE system. The multiple-antenna technology is widely applied because the multiple-antenna technology can be used to improve resource utilization without extra consumption of a time-frequency resource. In the multiple-antenna technology, a base station can support a plurality of (for example, eight or sixteen) antenna ports, and support transmission at a plurality of layers (for example, four layers or eight layers).

Communication channels between the base station and different user equipments may have different channel quality. Therefore, the different user equipments served by the base station may support different quantities of transport layers in a downlink direction.

Currently, an antenna port indication method generally includes: indicating, by the base station, based on a quantity of transport layers supported by the user equipment in the downlink direction, a fixed antenna port combination or one of two fixed antenna port combinations to user equipment. In this case, when the quantity of transport layers supported by the user equipment in the downlink direction is less than a quantity of antenna ports supported by the base station, some antenna ports supported by the base station cannot be indicated to the user equipment, and the antenna ports that are not indicated cannot be used by the user equipment. In other words, in the foregoing technical solution, a relatively small quantity of antenna ports are available to the user equipment. Consequently, in the system, each resource block can be multiplexed by a relatively small quantity of user equipments in the downlink direction of the system, resulting in relatively low system spectrum efficiency.

Based on this, the embodiments of the present invention further provide the following technical solutions to increase a quantity of available antenna ports provided by a base station for user equipment, so that a system has a capability of providing relatively high spectrum efficiency. Details are as follows:

According to a seventh aspect, an embodiment of the present invention provides an antenna port indication method, including: determining, by a base station, a quantity N1 of transport layers supported by user equipment in a downlink direction; and selecting N1 antenna ports from antenna ports supported by the base station, and then indicating the N1 antenna ports to the user equipment.

According to an eighth aspect, an embodiment of the present invention provides a base station, including a determining unit, a selection unit, and a sending unit. The determining unit is configured to determine a quantity N1 of transport layers supported by user equipment in a downlink direction. The selection unit is configured to select N1 antenna ports from antenna ports supported by the base station. The sending unit is configured to indicate the N1 antenna ports to the user equipment.

In comparison with the prior art in which when the user equipment supports a plurality of transport layers, the base station can provide only one fixed antenna port combination for the user equipment, in the technical solution provided in the seventh aspect or the eighth aspect, the base station can provide, for the user equipment, any N1 antenna ports in the antenna ports supported by the base station. In other words, the base station provides a relatively large quantity of available antenna ports for the user equipment. In this way, one resource block can be multiplexed by a plurality of user equipments in the downlink direction, so that a system has a capability of providing relatively high spectrum efficiency.

Optionally, according to the seventh aspect, the selecting, by the base station, N1 antenna ports from antenna ports supported by the base station, and then indicating the N1 antenna ports to the user equipment may include: selecting, by the base station, as a target antenna port combination, an antenna port combination corresponding to the quantity N1 of transport layers from a preset set; and indicating the target antenna port combination to the user equipment.

Correspondingly, according to the eighth aspect, the selection unit is specifically configured to select, as a target antenna port combination, an antenna port combination corresponding to the quantity N1 of transport layers from a preset set; and the sending unit is specifically configured to indicate the target antenna port combination to the user equipment.

Each antenna port combination corresponding to the quantity N1 of transport layers includes N1 antenna ports, and the preset set is a set that includes an antenna port combination supported by the base station and corresponding to each quantity of transport layers.

In an optional implementation 1, according to the seventh aspect or the eighth aspect, any two antenna port combinations corresponding to the quantity N1 of transport layers supported by the user equipment in the downlink direction include different antenna ports. In this optional implementation, a plurality of user equipments served by the base station can actually use a relatively large quantity of antenna ports, thereby improving system spectrum efficiency.

Preferably, the method provided in the seventh aspect may further include: classifying by the base station, every N1 antenna ports into one antenna port combination in a sequence of numbers of the antenna ports supported by the base station. Correspondingly, the base station provided in the eighth aspect may further include a classification unit, configured to classify every N1 antenna ports into one antenna port combination in a sequence of numbers of the antenna ports supported by the base station.

In an optional implementation 2, according to the seventh aspect or the eighth aspect, different antenna port combinations corresponding to the quantity N1 of transport layers supported by the user equipment in the downlink direction include some same ports. In this optional implementation, the user equipment served by the base station can select a relatively large quantity of antenna port combinations, so that the base station provides a relatively large quantity of available antenna ports for the user equipment, thereby improving system spectrum efficiency.

Preferably, the method provided in the seventh aspect may further include: using, by the base station, in a sequence of numbers of the antenna ports supported by the base station, each numbered antenna port as a first antenna port in an antenna port combination corresponding to the quantity N1 of transport layers supported by the user equipment in the downlink direction. Correspondingly, the base station provided in the eighth aspect may further include a classification unit, configured to use, in a sequence of numbers of the antenna ports supported by the base station, each numbered antenna port as a first antenna port in an antenna port combination corresponding to the quantity N1 of transport layers supported by the user equipment in the downlink direction.

In this implementation, for example, according to the seventh aspect, the indicating, by the base station, the target antenna port combination to the user equipment may include: indicating, by the base station, to the user equipment, the quantity N1 of transport layers corresponding to the target antenna port combination and a number of an antenna port at a specific location in the target antenna port combination. Correspondingly, according to the eighth aspect, the sending unit is specifically configured to indicate, to the user equipment, the quantity N1 of transport layers corresponding to the target antenna port combination and a number of an antenna port at a specific location in the target antenna port combination. This preferred implementation has an easy-to-implement beneficial effect.

According to a ninth aspect, an embodiment of the present invention provides a base station, and the base station has a function of implementing a base station side behavior in the method provided in the seventh aspect. The function may be implemented by using hardware, or may be implemented by hardware executing corresponding software. The hardware or software includes one or more modules corresponding to the foregoing function.

In a possible design, a structure of the base station includes a processor and a transmitter. The processor is configured to support the base station in performing a corresponding function in the foregoing method. The transmitter is configured to support communication between the base station and user equipment. The base station may further include a memory. The memory is configured to couple to the processor, and stores a program instruction and data that are required by the base station.

In addition, an embodiment of the present invention provides a computer storage medium, configured to store a computer software instruction used by the foregoing base station, and the computer storage medium includes a program designed to execute the seventh aspect.

The following describes application scenarios to which the technical solutions provided in this specification are applicable and explanation of some terms, so as to facilitate understanding by persons of ordinary skill in the art.

The technology described in this specification may be applied to various communications systems, for example, current 2G; 3G; and 4G communications systems, and a future evolved network such as a 5G communications system. For example, the technology is applied to code division multiple access (CDMA), wideband code division multiple access (WCDMA), time division multiple access (TDMA), frequency division multiple access (FDMA), orthogonal frequency division multiple access (OFDMA), single carrier frequency division multiple access (SC-FDMA), a Long Term Evolution (LTE) system, a Wireless Fidelity (Wi-Fi) system, a Worldwide Interoperability for Microwave Access (WiMAX) system, a cellular system related to the 3rd Generation Partnership Project (3GPP) or the like, and other such communications systems.

The user equipment may be a wireless terminal or a wired terminal. The wireless terminal may be a device that provides voice and/or data connectivity for a user, a handheld device having a wireless connection function, or another processing device connected to a wireless modem. The wireless terminal may communicate with one or more core networks by using a radio access network (RAN) (an access part of a wireless communications network). The wireless terminal may be a mobile terminal, such as a mobile phone (or referred to as a "cellular" phone) or a computer having a mobile terminal, for example, may be a portable, pocket-sized, handheld, computer built-in, or in-vehicle mobile apparatus, which exchanges voice and/or data with the radio access network. For example, the wireless terminal is a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, or user equipment.

The base station (for example, an access point) may be a device that is in an access network and that communicates, over an air interface, with a wireless terminal by using one or more sectors. The base station may be configured to mutually convert a received over-the-air frame and an IP packet, and serve as a router between the wireless terminal and a remaining part of the access network, where the remaining part of the access network may include an Internet Protocol (IP) network. The base station may further coordinate attribute management of the air interface. For example, the base station may be a base transceiver station (BTS) in GSM or CDMA, may be a NodeB (NodeB) in WCDMA, or may be an evolved NodeB (NodeB or eNB or eNodeB) in LTE. This is not limited in this application.

It should be noted that the 5G standard includes scenarios such as machine-to-machine (M2M), D2M, and macro-micro communication. These scenarios may include communication between user equipments, communication between base stations, communication between a base station and user equipment, and the like.

An example in which the technical solutions provided in the embodiments of the present invention are applied to an LTE system is used below for description. However, persons skilled in the art should understand that the technical solutions may be applied to another system. In addition, an example in which the technical solutions provided in the embodiments of the present invention are applied to communication between a base station and user equipment is used below for description. In specific implementation, the communication between a base station and user equipment may be extended to communication between various devices in 5G communication.

In addition, the terms "system" and "network" in this specification are usually used interchangeably in this specification. The term "and/or" in this specification describes only an association relationship for describing associated objects and represents that three relationships may exist. For example, A and/or B may represent the following three cases: Only A exists, both A and B exist, and only B exists. The character "/" in this specification usually indicates an "or" relationship between the associated objects. The term "a plurality of" in this specification means two or more than two.

In addition, it should be noted that some or all technical features in any two technical solutions provided in this specification may be used together without conflicting with each other, to form a new technical solution.

DESCRIPTION OF EMBODIMENTS

Related technologies in the embodiments of the present invention are briefly described first, so as to facilitate understanding by persons of ordinary skill in the art.

One resource block (RB) includes 12 consecutive subcarriers in frequency domain and one transmission time interval (TTI) in time domain. In different systems, one TTI may include different quantities of slots. Generally, one TTI may include one or two slots, and one slot includes seven symbols. A time-frequency resource including one subcarrier in frequency domain and one symbol in time domain is referred to as one resource element (RE).

Figure 1:
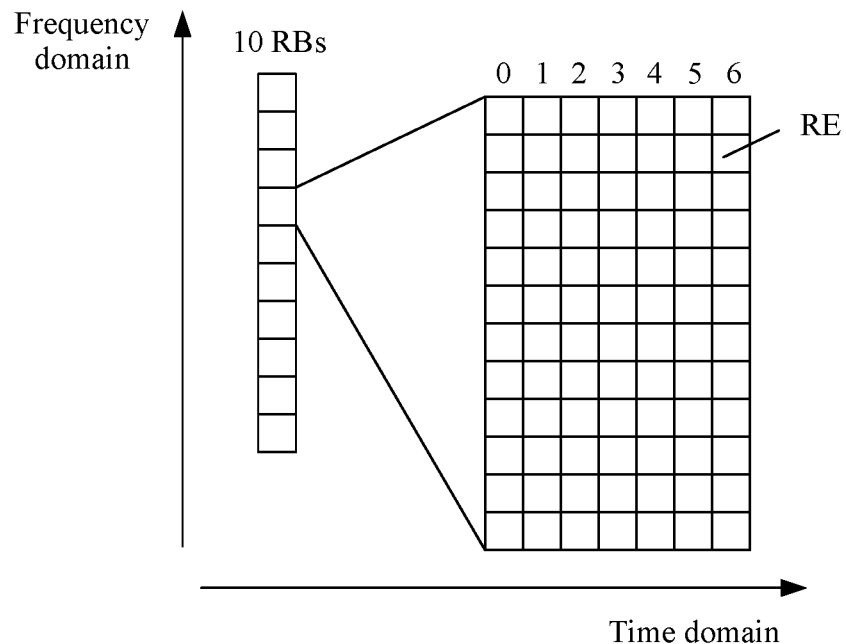
FIG. 1 is a schematic diagram of a time-frequency resource of one cell according to an embodiment of the present invention.

A base station may serve a plurality of cells, and a frequency domain resource of one cell may include a plurality of subcarriers. As shown in FIG. 1, FIG. 1 is a schematic diagram of a time-frequency resource of one cell. In FIG. 1, an example in which frequency domain resources of one cell are distributed on 120 subcarriers (i.e., 10 RBs), one RB includes one slot, and one slot includes seven symbols is used for description.

A base station allocates an antenna port to user equipment at a granularity of a resource block group. In the existing protocol, four consecutive RBs are usually referred to as one resource block group, which is represented by a resource block group (RBG). In actual implementation, a quantity of RBs included in one resource block group is not limited in the embodiments of the present invention. For example, the quantity may be any value such as 2, 3, or 5. A plurality of user equipments may multiplex one RB. For example, the base station allocates antenna ports to user equipments A and B on RBs 1 to 5 in the 10 RBs shown in FIG. 1, and allocates an antenna port to user equipment C on RBs 4 to 6.

To resolve the technical problem mentioned in the BACKGROUND part of this specification, the embodiments of the present invention provide an antenna port indication method and an apparatus. A basic principle thereof is as follows: A base station sends, to target user equipment, information about an antenna port used for an RB set used by the target user equipment, so that the target user equipment learns the antenna port used for the RB set used by the target user equipment, and the target user equipment can effectively use a transmission resource corresponding to an antenna port unused for the RB set, thereby improving transmission resource utilization.

The following describes the technical solutions in the embodiments of the present invention with reference to the accompanying drawings in the embodiments of the present invention.

Figure 2:
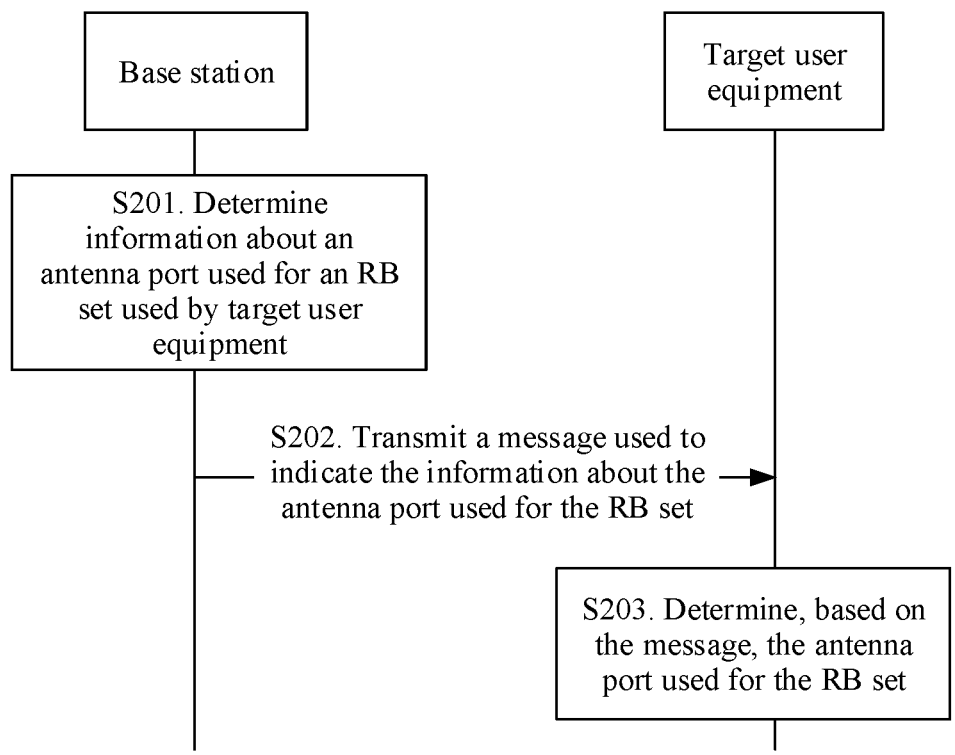
FIG. 2 is a schematic interaction diagram of a method for antenna port indication according to an embodiment of the present invention.

As shown in FIG. 2, FIG. 2 is a schematic interaction diagram of an antenna port indication method according to an embodiment of the present invention. The method shown in FIG. 2 includes the following steps: S201 and S203.

S201. A base station determines information about an antenna port used for an RB set used by target user equipment, where the antenna port used for the RB set is an antenna port used by all user equipments that receive a signal on each RB in the RB set.

The target user equipment may be any user equipment connected to the base station, in other words, any user equipment served by the base station. The RB set used by the target user equipment is a set that includes all RBs used by the target user equipment in a same TTI.

It is assumed that a correspondence among four user equipments (e.g., user equipments A, B, C, and D) served by the base station, an antenna port allocated by the base station to each user equipment, and an RB set used by each user equipment is shown in Table 1:

TABLE 1

| User equipment | RB set used by the user equipment | Antenna port allocated by the base station to the user equipment |
| --- | --- | --- |
| User equipment A | RBs 1 to 5 | Antenna ports 0 and 1 |
| User equipment B | RBs 1 to 5 | Antenna ports 0 to 3 |
| User equipment C | RBs 4 to 6 | Antenna ports 0 to 4 |
| User equipment D | RBs 7 to 10 | Antenna ports 0 to 2 |

It can be learned from Table 1 that if the target user equipment is the user equipment A or B, RBs used by the target user equipment are RBs 1 to 5. Because the user equipment C and the user equipments A and B multiplex the RBs 4 and 5, antenna ports used by the user equipments A, B, and C on the RBs 1 to 5 are respectively antenna ports 0 and 1, antenna ports 0 to 3, and antenna ports 0 to 4. Therefore, antenna ports used for the RBs 1 to 5 are the antenna ports 0 to 4. If the target user equipment is the user equipment C, RBs used by the target user equipment are RBs 4 to 6, and antenna ports used by the user equipments A, B, and C on the RBs 4 to 6 are respectively antenna ports 0 and 1, antenna ports 0 to 3, and antenna ports 0 to 4. Therefore, antenna ports used for the RBs 4 to 6 are the antenna ports 0 to 4. If the target user equipment is the user equipment D, RBs used by the target user equipment are RBs 7 to 10, and antenna ports used by user equipment on the RBs 7 to 10 are antenna ports 0 to 2. Therefore, antenna ports used for the RBs 7 to 10 are the antenna ports 0 to 2.

S202. The base station sends, to the target user equipment, a message that carries the information used to indicate the antenna port used for the RB set.

The information that is used to indicate the antenna port used for the RB set may be identifiers of all antenna ports used for the RB set, an identifier of a largest antenna port or a smallest antenna port used for the RB set, or other information, for example, an implicit indication manner described below. This is not limited in this embodiment of the present invention.

S203. The user equipment receives the message sent by the base station used for the RB set and determines, based on the message, the antenna port used for the RB set, where the message carries the information that is used to indicate the antenna port used for the RB set.

According to the antenna port indication method provided in this embodiment of the present invention, the user equipment can learn the antenna port used for the RB set used by the user equipment. Therefore, the user equipment can effectively use a transmission resource corresponding to an antenna port unused for the RB set. In comparison with the prior art, a data symbol can be sent on a transmission resource other than a transmission resource that is used to send a data symbol and that is common to all user equipments served by the base station, thereby improving transmission resource utilization.

Figure 3:
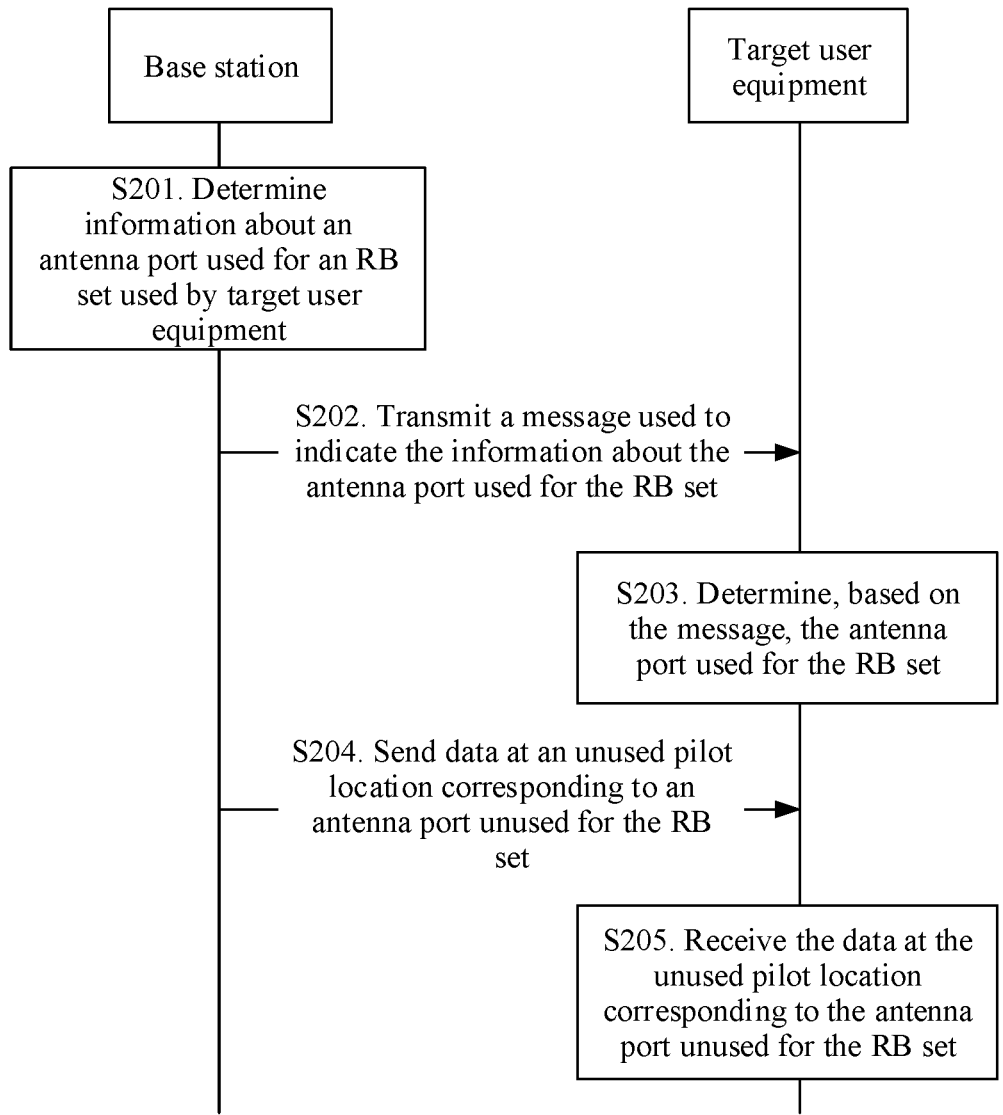
FIG. 3 is a schematic interaction diagram of a method for antenna port indication according to another embodiment of the present invention.

The following provides a specific example in which an antenna port unused for the RB set used by the target user equipment is used. Certainly, specific implementation is not limited thereto. Specifically, as shown in FIG. 3, in the method shown in FIG. 2, after S203, the method may further include the following steps: S204 and S205.

S204. The base station sends a data symbol to the target user equipment at an unused pilot location corresponding to an antenna port unused for the RB set.

It should be noted that in specific implementation, S204 may be performed before S203, or may be performed at the same time as S203. This is not limited in this embodiment of the present invention.

S205. The target user equipment determines, based on the antenna port that is used for the RB set and that is determined in S203, the antenna port unused for the RB set, and receives the data symbol at the unused pilot location corresponding to the antenna port unused for the RB set.

A pilot location is a location used to transmit a pilot symbol. Each antenna port supported by the base station corresponds to a fixed pilot location.

In an LTE system, a specific RE of the system in a downlink direction is used to transmit a pilot symbol, and other REs are used to transmit a data symbol. A location and content of the pilot symbol are known to both a sending party and a receiving party, and a location of the data symbol is known to both the sending party and the receiving party. However, content of the data symbol is known to the sending party, but is unknown to the receiving party. The receiving party may perform channel estimation based on a received pilot symbol, and then demodulate a data symbol based on a channel estimation result.

Figure 4:
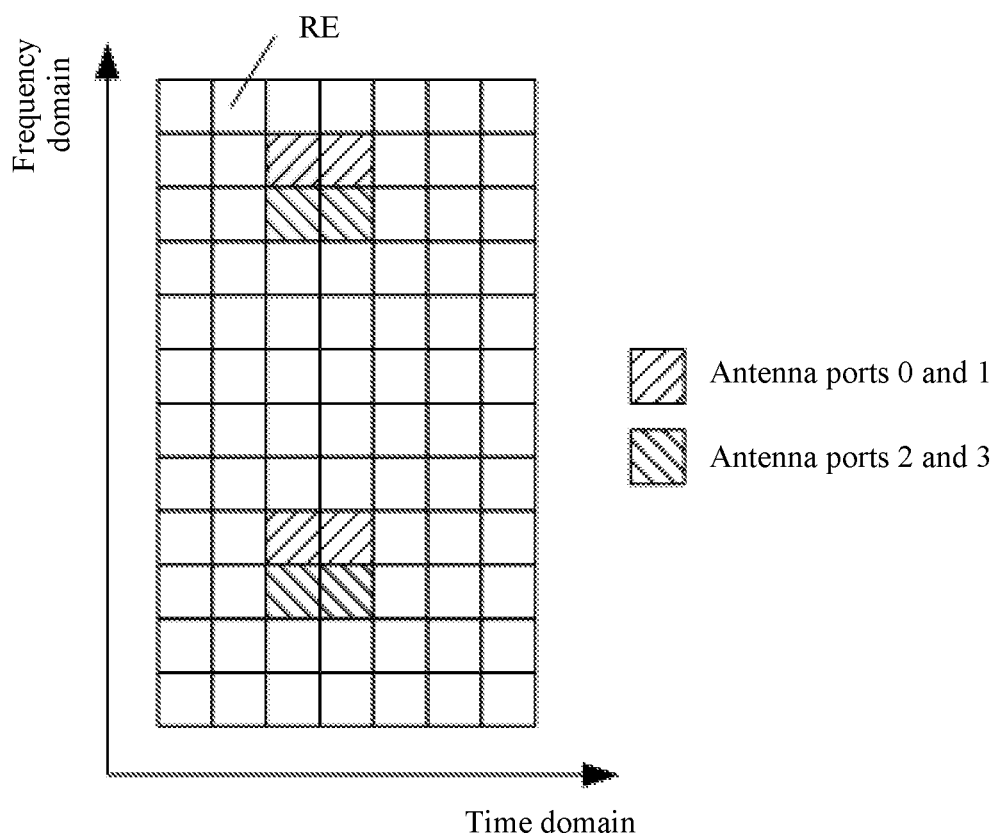
FIG. 4 is a schematic diagram of a pilot pattern using four antenna ports according to an embodiment of the present invention.
Figure 5:
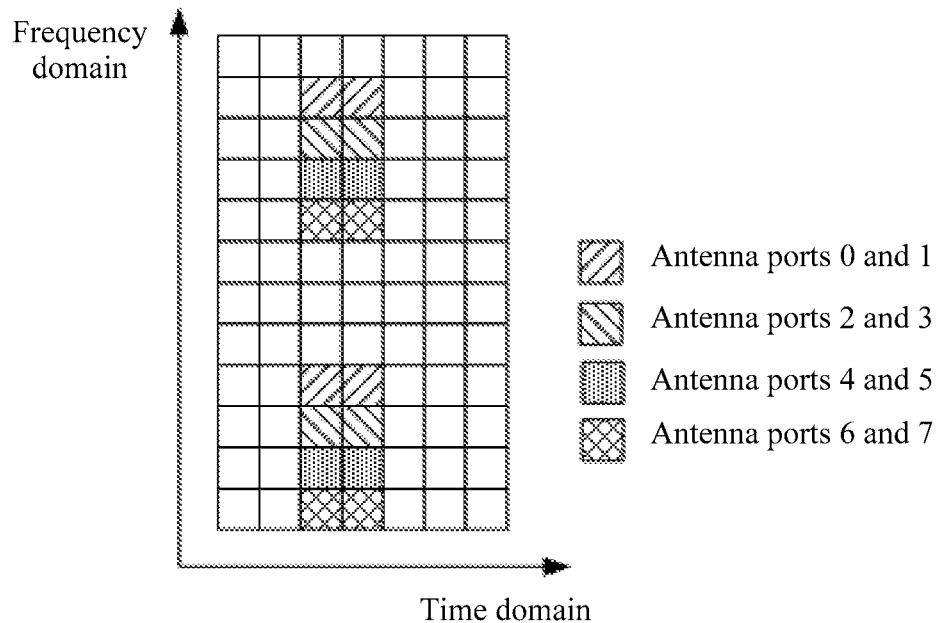
FIG. 5 is a schematic diagram of a pilot pattern using eight antenna ports according to an embodiment of the present invention.
Figure 6:
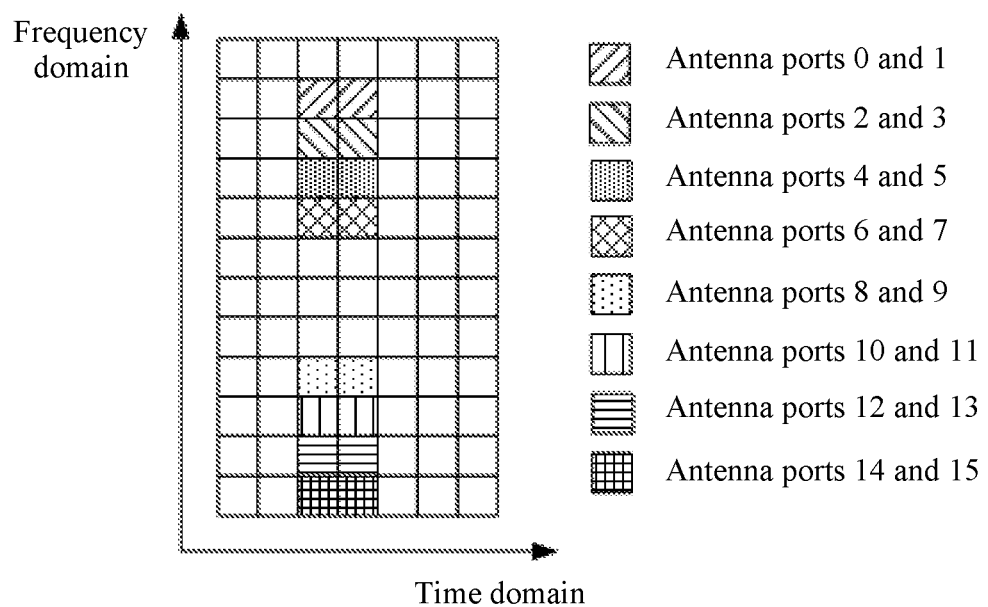
FIG. 6 is a schematic diagram of a pilot pattern using sixteen antenna ports according to an embodiment of the present invention.

A pilot pattern is a pattern used to describe a location relationship between an RE used to transmit a pilot symbol in a TTI and an RE used to transmit a data symbol in the TTI. The pilot pattern may be determined in advance based on a quantity of antenna ports supported by the base station, or may be determined in another manner, and may be sent by the base station to the user equipment. As shown in FIG. 4, FIG. 4 is a schematic diagram of a pilot pattern using four antenna ports. As shown in FIG. 5, FIG. 5 is a schematic diagram of a pilot pattern using eight antenna ports. As shown in FIG. 6, FIG. 6 is a schematic diagram of a pilot pattern using sixteen antenna ports.

FIG. 4 to FIG. 6 each shows a pilot pattern of an RB. An example in which one slot includes seven symbols is used for description. In addition, a horizontal axis represents a time domain direction, a vertical axis represents a frequency domain direction, each small box represents one RE, an RE represented by a small shadow box is used to send a pilot symbol, and an RE represented by a small blank box is used to send a data symbol. Each antenna port supported by the base station corresponds to a fixed pilot location, and this may be specifically embodied as follows: REs represented by different small shadow boxes in FIG. 4 to FIG. 6 correspond to different antenna ports. As shown in FIG. 4, pilot symbols sent on REs represented by small shadow boxes marked with left oblique lines correspond to antenna ports 0 and 1, and pilot symbols sent on REs represented by small shadow boxes marked with right oblique lines correspond to antenna ports 2 and 3.

The user equipment performs channel estimation by using a pilot symbol at a pilot location corresponding to an antenna port indicated by the base station to the user equipment, and then demodulates a data symbol based on a channel estimation result. For example, based on FIG. 4, if antenna ports indicated by the base station to user equipment are the antenna ports 0 and 1, the user equipment performs channel estimation only by using pilot symbols at pilot locations (namely, the REs represented by the small shadow boxes marked with the left oblique lines in FIG. 4) corresponding to the antenna ports 0 and 1, and then demodulates a data symbol based on a channel estimation result.

In the prior art, the base station sends data symbols to all user equipments served by the base station at a same location. For example, in the pilot pattern shown in FIG. 4, locations at which the base station sends data symbols to all the user equipments served by the base station are REs represented by small blank boxes in FIG. 4. In this case, in the foregoing example, resources at pilot locations (namely, the REs represented by the small shadow boxes marked with the right oblique lines in FIG. 4) corresponding to the antenna ports 2 and 3 are unused by the user equipment. Consequently, the resources are wasted for the user equipment.

In this optional implementation, the base station may send data symbols to different user equipments at different locations. For example, in the foregoing example, if antenna ports used for an RB set used by the user equipment are the antenna ports 0 and 1, the base station may send data symbols to the user equipment at unused pilot locations corresponding to the antenna ports 2 and 3. In this way, the user equipment can effectively use the resources. In other words, the base station can not only send data symbols to the user equipment on the REs represented by the small blank boxes in FIG. 4, but also send data symbols at the unused pilot locations corresponding to the antenna ports 2 and 3. In addition, because this does not affect a channel estimation result, demodulation of data symbols on the REs (namely, the REs represented by the small blank unmarked boxes in FIG. 4) used to transmit a data symbol is not affected. It should be noted that the base station and the user equipment may pre-agree that the base station sends data symbols at the unused pilot locations corresponding to the antenna port unused for the RB set used by the user equipment. A manner of the agreement may be preset, or may be implemented through signaling interaction.

If a pilot symbol at a pilot location is used, it is considered that another pilot symbol on a subcarrier on which the pilot symbol is located is also used. For example, as shown in FIG. 4, if a largest antenna port used for an RB set used by user equipment is the antenna port 0, and pilot symbols corresponding to the antenna port 0 and the antenna port 1 are located on a same subcarrier, it is considered that all the REs represented by the small shadow boxes marked with the left oblique lines in FIG. 4 are used. In this case, antenna ports unused by the RB set are antenna ports 2 to 3, and unused pilot locations corresponding to the unused antenna ports are all the REs represented by the small shadow boxes marked with the right oblique lines in FIG. 4.

In an optional implementation, the information that is used to indicate the antenna port used for the RB set includes a largest antenna port or a smallest antenna port used for the RB set. The largest antenna port is an antenna port with a largest number, and the smallest antenna port is an antenna port with a smallest number.

It should be noted that antenna ports used by all user equipments served by the base station are indicated by the base station to the user equipments. The base station usually indicates antenna ports to the user equipment in ascending order or descending order of numbers of the antenna ports supported by the base station. For example, if the antenna ports supported by the base station are numbered 0 to 15 and the user equipment supports three transport layers, the base station usually indicates antenna ports 0 to 2 to the user equipment (to be specific, indicates the antenna ports in ascending order of numbers of the antenna ports), or indicates antenna ports 15, 14, and 13 to the user equipment (to be specific, indicates the antenna ports in descending order of numbers of the antenna ports). For another example, if the antenna ports supported by the base station are numbered 0 to 15 and the user equipment supports four transport layers, the base station usually indicates antenna ports 0 to 3 to the user equipment (to be specific, indicates the antenna ports in ascending order of numbers of the antenna ports), or indicates antenna ports 15, 14, 13, and 12 to the user equipment (to be specific, indicates the antenna ports in descending order of numbers of the antenna ports).

Based on this, S201 may include: if the base station indicates antenna ports in ascending order of numbers of the antenna ports supported by the base station, determining, by the base station, the largest antenna port used for the RB set; or if the base station indicates antenna ports in descending order of numbers of the antenna ports supported by the base station, determining, by the base station, the smallest antenna port used for the RB set.

If in S201, the base station determines the largest antenna port used for the RB set used by the target user equipment, in S202, the message sent by the base station carries information indicating the largest antenna port. Similarly, if in S201, the base station determines the smallest antenna port used for the RB set used by the target user equipment, in S202, the message sent by the base station carries information indicating the smallest antenna port.

In an optional implementation, S202 may include: sending, by the base station, to the target user equipment, downlink control information (DCI) carrying the information that is used to indicate the antenna port used for the RB set.

Specifically, the base station may explicitly indicate, in the DCI, the information that is used to indicate the antenna port used for the RB set, for example, the base station may use a field newly defined in the DCI to explicitly indicate the information that is used to indicate the antenna port used for the RB set. In addition, the base station may implicitly indicate, in the DCI, the information that is used to indicate the antenna port used for the RB set, for example, the base station may implicitly indicate, by using an existing field in the DCI, the information that is used to indicate the antenna port used for the RB set, for example, indicate, by using a downlink power offset field in the DCI, the information that is used to indicate the antenna port used for the RB set. In the prior art, the downlink power offset field is used to indicate a power ratio (ρ is used to represent the power ratio below) of energy per RE (EPRE) of a physical downlink shared channel (PDSCH) to EPRE of a demodulation reference signal (DMRS) of the PDSCH.

Certainly, in specific implementation, a newly defined message may be used to carry the information that is used to indicate the antenna port used for the RB set. This is not limited in this embodiment of the present invention.

In an optional implementation, a value of a power offset field may be used to indicate antenna ports used for an RB set used by a plurality of user equipments. If the information that is used to indicate the antenna port used for the RB set is the largest antenna port used for the RB set, the value of the power offset field is used to indicate an antenna port with a largest number in the antenna ports used for the RB set used by the plurality of user equipments; or if the information used to indicate the antenna port used for the RB set is the smallest antenna port used for the RB set, the value of the power offset field is used to indicate an antenna port with a smallest number in the antenna ports used for the RB set used by the plurality of user equipments.

For example, as shown in FIG. 5, code division multiplexing is performed between antenna ports 0 and 1 to use a same time-frequency resource, and code division multiplexing is performed between antenna ports 2 and 3 to use a same time-frequency resource. In this case, user equipments whose RB set uses largest antenna ports 0 and 1 may be used as "a plurality of user equipments"; or user equipments whose RB set uses largest antenna ports 0, 1, 2, and 3 may be used as "a plurality of user equipments". Then a value of a power offset field is used to indicate antenna ports used for the RB set used by the plurality of user equipments.

If the information that is used to indicate the antenna port used for the RB set is the largest antenna port used for the RB set, the value of the power offset field may be used to indicate an antenna port with a largest number that is used for an RB set used by each of the plurality of user equipments. For a specific example, refer to Table 3 or Table 4. Alternatively, if the information that is used to indicate the antenna port used for the RB set is the smallest antenna port used for the RB set, the value of the power offset field may be used to indicate an antenna port with a smallest number that is used for an RB set used by each of the plurality of user equipments. For a specific example, refer to Table 3 or Table 4.

In an optional implementation, the information that is used to indicate the antenna port used for the RB set may include an identifier of an antenna port used by user equipment that receives a signal on the RB set. The "user equipment" herein may be all user equipments that receive a signal on the RB set, or may be another user equipment different from the target user equipment. Which user equipment that the "user equipment" herein specifically means may be preset by the base station and the user equipment, or may be dynamically or semi-statically configured by using signaling. This is not limited in this application. For example, the user equipment that receives a signal on the RB set includes user equipment 1 and user equipment 2, antenna ports used by the user equipment 1 are numbered 0 and 1, and antenna ports used by the user equipment 2 are numbered 2 and 3. In this case, the information that is used to indicate the antenna port used for the RB set and that is sent by the base station to the user equipment 1 may be antenna ports 0 to 3, or may be antenna ports 2 and 3.

In an optional implementation, the information that is used to indicate the antenna port used for the RB set may include an identifier of an antenna port set used by user equipment that receives a signal on the RB set. The "user equipment" herein may be all user equipments that receive a signal on the RB set, or may be another user equipment different from the target user equipment. Which user equipment that the "user equipment" herein specifically means may be preset by the base station and the user equipment, or may be dynamically or semi-statically configured by using signaling. This is not limited in this application. In addition, a specific implementation of classifying antenna ports into antenna port sets is not limited in this application, and the manner of classifying antenna ports into antenna port sets may be preset, or may be dynamically or semi-statically configured by using signaling. This is not limited in this application. For example, the user equipment that receives a signal on the RB set includes user equipment 1 and user equipment 2, antenna ports used by the user equipment 1 are numbered 0 to 3, and antenna ports used by the user equipment 2 are numbered 4 to 7. In this case, the base station may classify antenna ports 0 to 7 into a set 1 and a set 2, and allocate an identifier/index to each set, for example, an index of the set 1 is index=1, and an index of the set 2 is index=2. In this case, the information that is used to indicate the antenna port used for the RB set and that is sent by the base station to the user equipment 1 may be index=1 and index=2, or may be index=2.

Optionally, in the implementation in which the downlink power offset field in the DCI is used to indicate the information that is used to indicate the antenna port used for the RB set, a quantity of bits occupied by the downlink power offset field is greater than or equal to 2. For a specific example, refer to Table 3 or Table 4. In comparison with the prior art, in this optional implementation, a relatively large quantity of bits can be used to accurately represent a value of $\rho$.

Figure 7:
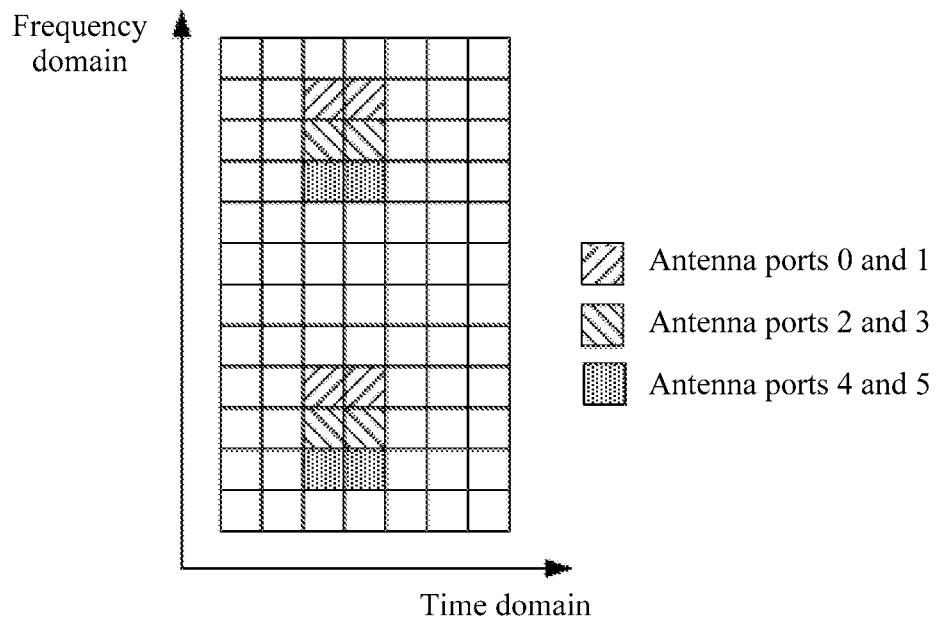
FIG. 7 is a schematic diagram of a pilot pattern used for an RB set used by target user equipment according to an embodiment of the present invention.

In the prior art, the downlink power offset field in the DCI occupies 1 bit, and only two configurations are supported: $\rho$ (unit: decibel dB) is 0 or −3. The base station sets, to 0, a value of $\rho$ for user equipment that supports transport layers of a quantity that is less than or equal to 2, and sets, to −3, a value of $\rho$ for user equipment that supports transport layers of a quantity that is greater than 2. In this case, when a ratio of a quantity of layers at which data symbols are multiplexed to a quantity of layers at which pilot symbols are multiplexed is greater than or equal to 2, pilot symbol power is not fully used. For example, based on the pilot pattern shown in FIG. 5, if the RB set used by the target user equipment uses six antenna ports, to be specific, a largest antenna port is numbered 5, a pilot pattern used for the RB set used by the target user equipment is shown in FIG. 7. It can be learned from FIG. 7 that power of EPRE of a PDSCH may be represented as ⅙. It can be learned based on $\rho=-3$ and the power ⅙ of the EPRE of the PDSCH that power of EPRE of a DMRS of the PDSCH may be represented as ⅓. It can be learned from FIG. 7 that pilot symbols are multiplexed only at two layers, and then the power of the EPRE of the DMRS of the PDSCH should be represented as ½. Therefore, in the manner of configuring $\rho$ in the prior art, pilot symbol power is not fully used, resulting in relatively low pilot symbol power utilization.

A manner of reconfiguring the value of $\rho$ is further provided in this embodiment of the present invention. Specifically, the value of $\rho$ is configured according to a rule that the power of the EPRE of the DMRS of the PDSCH matches a quantity of layers at which pilot symbols are multiplexed (for example, if pilot symbols are multiplexed at two layers, the power of the EPRE of the DMRS of the PDSCH is represented as ½). For a specific example, refer to Table 3 or Table 4.

In specific implementation, the base station and the user equipment may pre-agree on a correspondence between an index (English: Index) value and $\rho$. A downlink power offset field indicated by the base station to the user equipment is specifically an index value, and the user equipment may determine a value of $\rho$ based on the index value. In the prior art, the correspondence between an index value and $\rho$ is shown in Table 2:

TABLE 2

| | Index | |
|---|---|---|
| | 0 | 1 |
| $\rho$ (unit: dB) | 0 | −3 |

In the technical solution provided in this embodiment of the present invention, the correspondence between an index value and $\rho$ may be shown in Table 3 or Table 4. In addition, Table 3 and Table 4 further show a correspondence between $\rho$ and a quantity of transport layers and a correspondence between $\rho$ and a number of a largest antenna port. The quantity of transport layers is a quantity of transport layers supported by the user equipment, and may be obtained based on a number of a largest antenna port supported by the base station. It should be noted that both Table 3 and Table 4 are described by using the pilot pattern shown in FIG. 6 as an example, and by using an example in which the information that is used to indicate the antenna port used for the RB set is the largest antenna port used for the RB set.

TABLE 3

| Index | 0 | 1 | 2 | 3 | 4 | 5 | 6 | 7 |
|---|---|---|---|---|---|---|---|---|
| Quantity of transport layers | 1 or 2 | 3 or 4 | 5 or 6 | 7 or 8 | 9 or 10 | 11 or 12 | 13 or 14 | 15 or 16 |
| Number of the largest antenna port | 0 or 1 | 2 or 3 | 4 or 5 | 6 or 7 | 8 or 9 | 10 or 11 | 12 or 13 | 14 or 15 |
| $\rho$ (unit: dB) | 0 | −3 | −4.7 | −6 | −7 | −7.8 | −8.5 | −9 |

TABLE 4

| Index | 0 | 1 | 2 | 3 | 4 |
|---|---|---|---|---|---|
| Quantity of transport layers | 1 or 2 | 3, 4, 5, or 6 | 7, 8, 9, or 10 | 11, 12, 13, or 14 | 15 or 16 |
| Number of the largest antenna port | 0 or 1 | 2, 3, 4, or 5 | 6, 7, 8, or 9 | 10, 11, 12, or 13 | 14 or 15 |
| ρ (unit: dB) | 0 | −4.7 | −7 | −8.5 | −9 |

Both Table 3 and Table 4 are described by using an example in which a value of a power offset field is used to indicate antenna ports used for an RB set used by a plurality of user equipments. In Table 3, a value of ρ may indicate antenna ports used for an RB set used by two user equipments. In Table 4, a value of ρ may indicate antenna ports used for an RB set used by two or four user equipments. In addition, values of ρ in Table 3 and Table 4 are calculated based on a formula $$\rho = lg\frac{P1}{P2}$$

and corresponding numbers of the largest antenna port, where P1 is power of EPRE of a PDSCH, and P2 is power of EPRE of a DMRS of the PDSCH. An example of a calculation process of ρ=−4.7 in Table 3 is used for description. Because in this case, a largest antenna port used for an RB set is numbered 5, in other words, the RB set uses six antenna ports, the power of the EPRE of the PDSCH, namely, P1 may be represented as ⅙. It can be learned from FIG. 6 that each pilot symbol is multiplexed at two layers. Therefore, the power of the EPRE of the DMRS of the PDSCH, namely, P2 may be represented as ½. Therefore, it can be learned that in this case $$\rho = lg\frac{P1}{P2} = lg\left(\frac{1}{6} \div \frac{1}{2}\right) = lg\frac{1}{3} = -4.7.$$

Another formula for calculating the value of ρ is similar to this formula, and details are not described herein.

In Table 3, when index=0, the user equipment supports one or two transport layers. It can be learned from Table 3 that when the base station indicates index=0 to the user equipment, the user equipment may learn the following content based on index=0 and Table 3: (1) The user equipment supports one or two transport layers. (2) A largest antenna port used for an RB set used by the user equipment is numbered 1. (3) A value of ρ is 0. In addition, it can be further learned that an antenna port used for the RB set used by the user equipment is an antenna port 0, or an antenna port 0 and an antenna port 1. No other examples are described one by one herein again.

An example in which the base station indicates antenna ports in descending order of numbers of the antenna ports supported by the base station may be derived from the foregoing example, and details are not described herein again.

Figure 8:
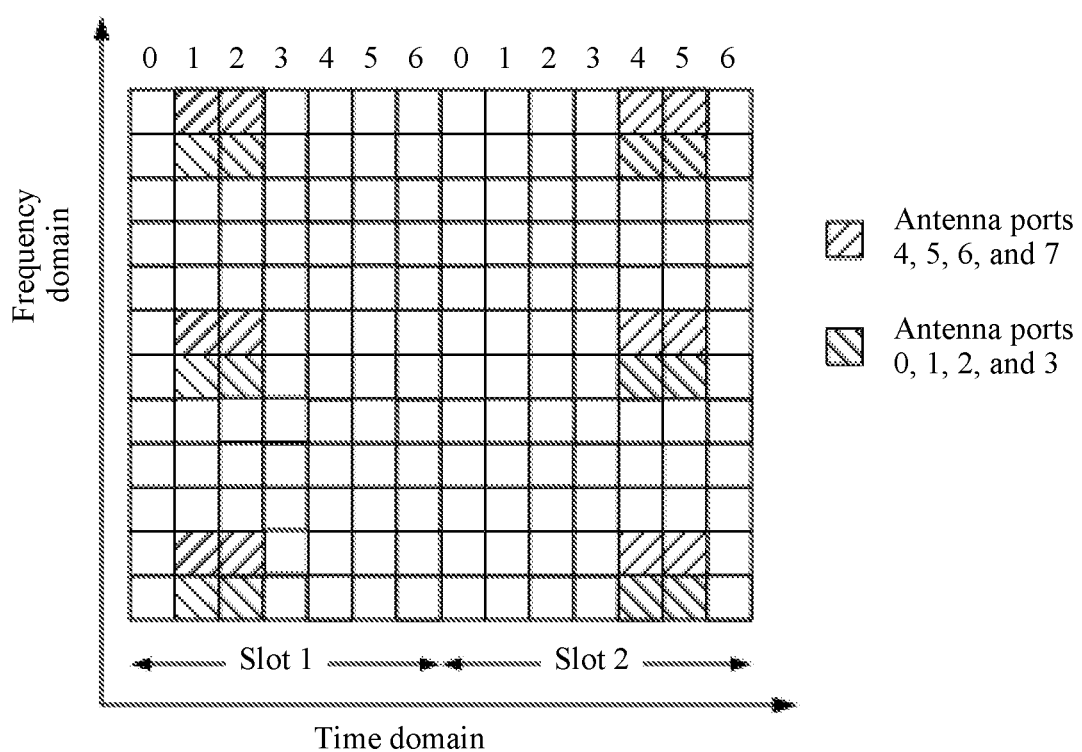
FIG. 8 is a schematic diagram of a pilot pattern using eight antenna ports according to an embodiment of the present invention.

In addition, in specific implementation, one RB set may include 12 consecutive subcarriers in frequency domain and two slots in time domain. As shown in FIG. 8, FIG. 8 is a schematic diagram of a pilot pattern using eight antenna ports in this case. In the solution shown in FIG. 8, there are four layers at which pilot symbols are multiplexed. A correspondence, shown in Table 5, among an index, a quantity of transport layers, a number of a largest antenna port, and ρ may be learned based on the foregoing example. For representing a largest antenna port used for an RB set used by a plurality of user equipments, a manner of calculating the value of ρ, and the like by using a value of ρ, refer to the foregoing description, and details are not described herein again.

TABLE 5

| | Index | |
|---|---|---|
| | 0 | 1 |
| Quantity of transport layers | 1, 2, 3, or 4 | 5, 6, 7, or 8 |
| Number of the largest antenna port | 0, 1, 2, or 3 | 4, 5, 6, or 7 |
| ρ (unit: dB) | 0 | −3 |

It should be noted that, in the foregoing example in which the implicit indication method is used to indicate the antenna ports used for the RB set used by the plurality of user equipments, the base station may send a same value of ρ to the plurality of user equipments. For a manner of determining the value of ρ, refer to Table 3 and Table 4.

On the basis that the power offset field is used to implicitly indicate the antenna port used for the RB set, a method for sending a pilot symbol is provided below. Specifically, a base station sends, by using total transmit power, a pilot symbol to target user equipment at a pilot location corresponding to an antenna port used for each resource block group. The resource block group is any one of at least one resource block group to which an RB used by the target user equipment belongs, and the total transmit power is a sum of pilot transmit power at pilot locations corresponding to all antenna ports supported by the base station.

One user equipment may use different numbers of antenna ports on different resource block groups. An example in which a resource block group is an RBG is used below for description.

Figure 9:
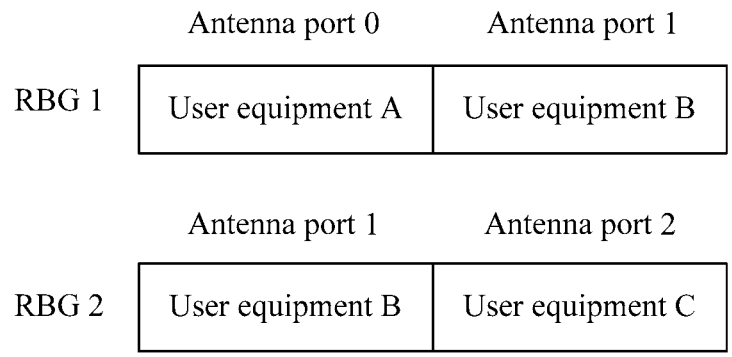
FIG. 9 is a schematic diagram of allocating an antenna port by a base station to user equipment according to an embodiment of the present invention.

For example, as shown in FIG. 9, on an RBG 1, the base station allocates an antenna port 0 to user equipment A, and allocates an antenna port 1 to user equipment B. On an RBG 2, the base station allocates the antenna port 1 to the user equipment B, and allocates an antenna port 2 to user equipment C. In addition, if a pilot pattern applicable to the example is shown in FIG. 4, in the antenna port indication method provided above, antenna ports used for an RB set used by the user equipment A are antenna ports 0 and 1, and antenna ports used for an RB set used by the user equipment B are antenna ports 0 to 2. Further, in the optional embodiment in which the power offset field is used to implicitly indicate the antenna port used for the RB set as shown in FIG. 3, a value of ρ should be −3. In this optional implementation, the base station may apply, to pilot symbols corresponding to the antenna ports (namely, the antenna ports 0 and 1) used for the RBG 1, transmit power of pilot symbols corresponding to the antenna ports (namely, the antenna ports 2 and 3) unused for the RBG 1; and then the base station sends, on the RBG 1 by using transmit power at pilot locations corresponding to antenna ports 0 to 3, a pilot symbol to the user equipment A or the user equipment B at pilot locations corresponding to the antenna ports 0 and 1.

It should be noted that if an RB used by the target user equipment (for example, the user equipment A) belongs to one RBG, in this optional implementation, pilot symbol receiving performance can be improved through power sharing. If an RB used by the target user equipment (for example, the user equipment B) belongs to a plurality of RBGs, in this optional implementation, power of sending pilot symbols by one user equipment on all RBs used by the user equipment is unified. Therefore, power control computation complexity can be simplified. Certainly, this optional implementation may be further applied to a scenario in which an RB used by one user equipment belongs to three or more RBGs. For a specific implementation in the scenario, refer to the foregoing scenario in which an RB used by one user equipment belongs to two RBGs, and details are not described herein again.

In an optional embodiment, the foregoing "antenna port used for the RB set" is a pilot antenna port used for the RB set. The antenna port corresponds to a pilot location. In this case, the method may further include: sending, by the base station, indication information to the target user equipment, where the indication information is used to instruct the target user equipment not to, when sending data, occupy a resource corresponding to an antenna port that is used by user equipment (including some or all user equipments other than the target user equipment) other than the target user equipment in the pilot antenna port used for the RB set. Optionally, the indication information may include identifiers of antenna ports that are used by some or all user equipments other than the target user equipment in pilot antenna ports used for the RB set.

For example, it is assumed that the RB set includes one RB, user equipments that receive a pilot symbol on the RB are user equipment 1 and user equipment 2, a pilot antenna port used by the user equipment 1 is an antenna port 0, and pilot antenna ports used by the user equipment 2 are antenna ports 1 to 3. Then the base station sends the indication information to the user equipment 1, where the indication information includes identifiers of the antenna ports 1 to 3. After receiving the indication information, when sending data (to be specific, a data symbol) to the base station, the user equipment 1 does not occupy resources corresponding to the antenna ports 1 to 3. The "resources" herein include but are not limited to a time-frequency resource, a port resource, a space division resource, or the like.

The following describes apparatus embodiments of the present invention correspond to the method embodiments provided above. It should be noted that, for explanation of related content in the following apparatus embodiments, refer to the foregoing method embodiments.

Figure 10:
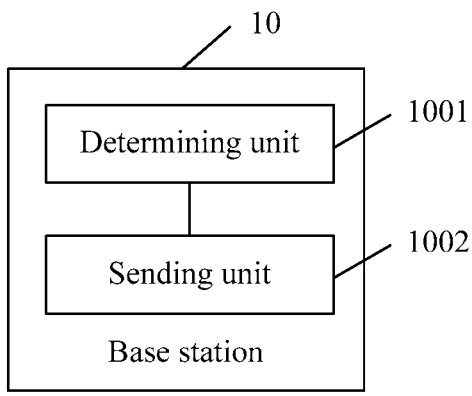
FIG. 10 is a schematic structural diagram of a base station according to an embodiment of the present invention.

As shown in FIG. 10, FIG. 10 is a schematic structural diagram of a base station 10 according to an embodiment of the present invention. The base station 10 is configured to perform the actions of the base station in any one of the methods provided above. The base station 10 may include a determining unit 1001 and a sending unit 1002.

The determining unit 1001 is configured to determine information about an antenna port used for a resource block RB set used by target user equipment, where the antenna port used for the RB set is an antenna port used by all user equipments that receive a signal on each RB in the RB set.

The sending unit 1002 is configured to send, to the target user equipment, a message carrying the information that is used to indicate the antenna port used for the RB set.

Optionally, the information that is used to indicate the antenna port used for the RB set may include a largest antenna port or a smallest antenna port used by all the user equipments that receive a signal on the RB set, where the largest antenna port is an antenna port with a largest number, and the smallest antenna port is an antenna port with a smallest number. Certainly, specific implementation is not limited thereto. For a specific example, refer to the foregoing description, and details are not described herein again.

Optionally, the sending unit 1002 may be specifically configured to send, to the target user equipment, downlink control information DCI carrying the information that is used to indicate the antenna port used for the RB set.

Optionally, a downlink power offset field in the DCI is used to indicate the information that is used to indicate the antenna port used for the RB set; or a field newly defined in the DCI is used to indicate the information that is used to indicate the antenna port used for the RB set.

Optionally, if the downlink power offset field in the DCI is used to indicate the information that is used to indicate the antenna port used for the RB set, a quantity of bits occupied by the downlink power offset field is greater than or equal to 2.

Optionally, if the information that is used to indicate the antenna port used for the RB set is the largest antenna port used for the RB set, a value of a power offset field is used to indicate an antenna port with a largest number in antenna ports used for an RB used by a plurality of user equipments; or if the information that is used to indicate the antenna port used for the RB set is the smallest antenna port used for the RB set, a value of a power offset field is used to indicate an antenna port with a smallest number in antenna ports used for an RB used by a plurality of user equipments. The plurality of user equipments include the target user equipment.

Optionally, the sending unit 1002 may be further configured to send a data symbol to the target user equipment at an unused pilot location corresponding to an antenna port unused for the RB set.

In hardware implementation, the sending unit 1002 may be a transmitter. In specific implementation, the base station 10 may further include a receiver. The transmitter and the receiver may be integrated together to form a transceiver. The determining unit 1001 may be built in or independent of a processor of the base station 10 in a hardware form, or may be stored in a software form in a memory of the base station 10, so that the processor performs an operation corresponding to each of the foregoing modules.

Figure 11:
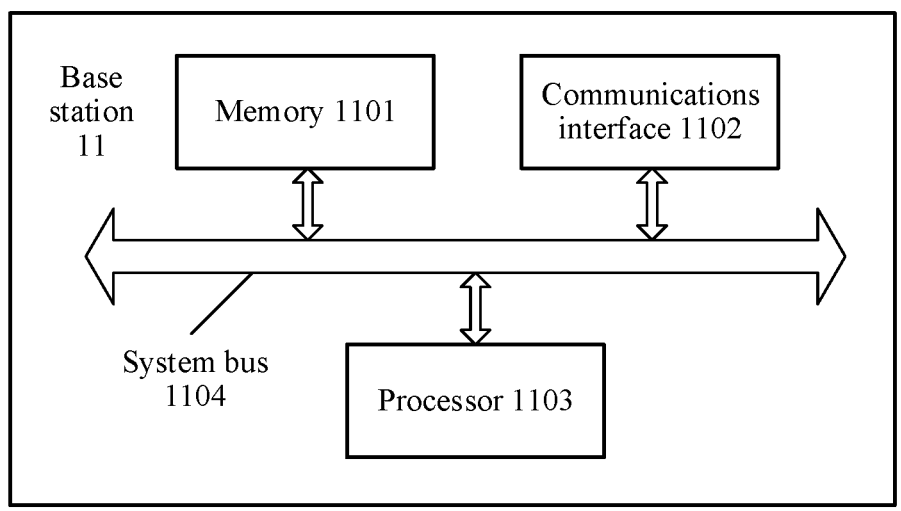
FIG. 11 is a schematic structural diagram of another base station according to an embodiment of the present invention.

As shown in FIG. 11, FIG. 11 is a schematic structural diagram of a base station 11 according to an embodiment of the present invention. The base station 11 is configured to perform the actions of the base station in any one of the methods provided above. The base station 11 includes a memory 1101, a communications interface 1102, a processor 1103, and a system bus 1104. The communications interface 1102 and the processor 1103 are connected by using the system bus 1104.

The memory 1101 is configured to store a computer executable instruction. When the base station 11 runs, the processor 1103 executes the computer executable instruction stored in the memory 1101, so that the base station 11 performs the actions of the base station in any one of the method embodiments provided above. Specifically, for the actions performed by the base station, refer to the foregoing related description, and details are not described herein again.

In a specific implementation process, each step in the foregoing method procedure may be implemented in a manner in which the processor 1103 in a hardware form executes the computer executable instruction in a software form that is stored in the memory 1101. To avoid repetition, details are not described herein again.

This embodiment further provides a storage medium, and the storage medium may include the memory 1101.

The base station 10 and the base station 11 provided in the embodiments of the present invention may be configured to perform the actions performed by the base station in the foregoing method procedure. Therefore, for technical effects that can be achieved by the base station 10 and the base station 11, refer to the foregoing method embodiments, and details are not described herein again.

Figure 12:
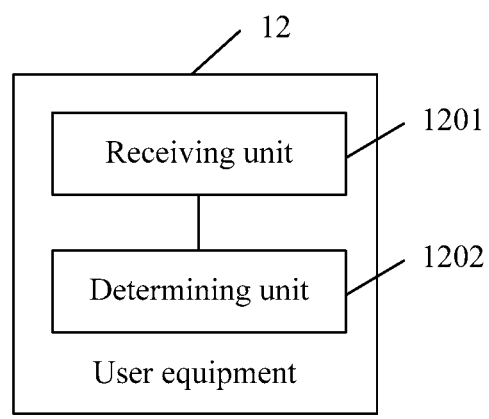
FIG. 12 is a schematic structural diagram of user equipment according to an embodiment of the present invention.

As shown in FIG. 12, FIG. 12 is a schematic structural diagram of user equipment 12 according to an embodiment of the present invention. The user equipment 12 is configured to perform the actions of the user equipment in any one of the methods provided above. The user equipment 12 may include:

a receiving unit 1201, configured to receive a message carrying information that is used to indicate an antenna port used for a resource block RB used by the user equipment, where the message is sent by a base station, and the antenna port used for the RB set is an antenna port used by all user equipments that receive a signal on each RB in the RB set; and a determining unit 1202, configured to determine, based on the message, the antenna port used for the RB set.

Optionally, the receiving unit 1201 may be further configured to receive a data symbol at an unused pilot location corresponding to an antenna port unused for the RB set.

In hardware implementation, the receiving unit 1201 may be a receiver. In specific implementation, the user equipment 12 may further include a transmitter. The transmitter and the receiver may be integrated together to form a transceiver. The determining unit 1202 may be built in or independent of a processor of the user equipment 12 in a hardware form, or may be stored in a software form in a memory of the user equipment 12, so that the processor performs an operation corresponding to each of the foregoing modules.

Figure 13:
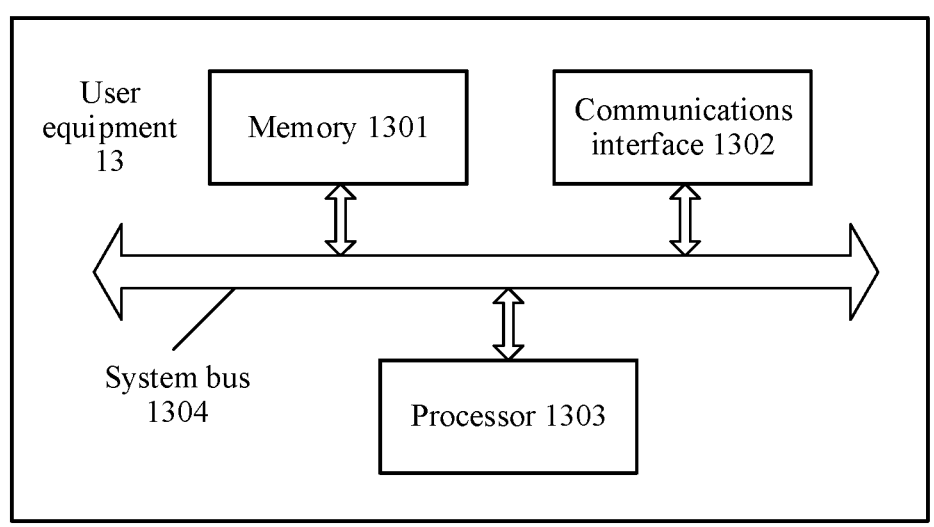
FIG. 13 is a schematic structural diagram of another user equipment according to an embodiment of the present invention.

As shown in FIG. 13, FIG. 13 is a schematic structural diagram of user equipment 13 according to an embodiment of the present invention. The user equipment 13 is configured to perform the actions of the user equipment in any one of the methods provided above. The user equipment 13 includes a memory 1301, a communications interface 1302, a processor 1303, and a system bus 1304. The communications interface 1302 and the processor 1303 are connected by using the system bus 1304.

The memory 1301 is configured to store a computer executable instruction. When the user equipment 13 runs, the processor 1303 executes the computer executable instruction stored in the memory 1301, so that the user equipment 13 performs the actions of the base station in any one of the method embodiments provided above. Specifically, for the actions performed by the base station, refer to the foregoing related description, and details are not described herein again.

In a specific implementation process, each step in the foregoing method procedure may be implemented in a manner in which the processor 1303 in a hardware form executes the computer executable instruction in a software form that is stored in the memory 1301. To avoid repetition, details are not described herein again.

This embodiment further provides a storage medium, and the storage medium may include the memory 1301.

The user equipment 12 and the user equipment 13 provided in the embodiments of the present invention may be configured to perform the actions performed by the user equipment in the foregoing method procedure. Therefore, for technical effects that can be achieved by the user equipment 12 and the user equipment 13, refer to the foregoing method embodiments, and details are not described herein again.

The following describes the technical solutions provided in the seventh aspect and the eighth aspect provided in the SUMMARY part of this document.

Related content involved in the technical solutions is first described, so as to facilitate understanding by persons skilled in the art.

In an LTE system, a downlink sending process may include: performing, by a base station, channel coding on upper-layer data to obtain codewords; modulating different codewords to generate modulation signals; combining modulation signals of different codewords together to perform layer mapping; and performing precoding on data obtained after the layer mapping, and mapping the data to an antenna port for sending. The codewords refer to data obtained after channel coding is performed on an upper-layer service stream. Different codewords q are used to distinguish between different data streams. A purpose thereof is to send multi-channel data through multiple-input multiple-output (MIMO), so as to implement spatial multiplexing. Because a quantity of codewords is inconsistent with a quantity of transmit antennas, and codeword streams need to be mapped to different transmit antennas, a layer (also referred to as a transport layer) and precoding need to be used. A quantity of layers is less than a quantity P of antenna ports used for physical channel transmission.

In the prior art, the base station indicates one or two fixed antenna port combinations to user equipment based on a quantity of transport layers supported by the user equipment in a downlink direction. For example, in the LTE protocol, DCI 2C is a scheduling indication for an antenna port in a transmission mode 9 (TM9). In the TM9, the base station supports a maximum of eight transport layers. In the DCI 2C, an indication method for eight antenna ports (the base station supports eight antenna ports) is shown in Table 6, and the eight antenna ports are numbered 0 to 7.

TABLE 6

| One Codeword (one codeword) Codeword 0 enabled, Codeword 1 disabled | | Two Codewords (two codewords) Codeword 0 enabled, Codeword 1 enabled | |
| --- | --- | --- | --- |
| Value (value) | Message (message) | Value | Message |
| 0 | Quantity 1 of transport layers, an antenna port 0, and $n_{SCID} = 0$ | 0 | Quantity 2 of transport layers, antenna ports 0 and 1, and $n_{SCID} = 0$ |

TABLE 6-continued

| One Codeword (one codeword) Codeword 0 enabled, Codeword 1 disabled | | Two Codewords (two codewords) Codeword 0 enabled, Codeword 1 enabled | |
|---|---|---|---|
| Value (value) | Message (message) | Value | Message |
| 1 | Quantity 1 of transport layers, an antenna port 0, and $n_{SCID} = 1$ | 1 | Quantity 2 of transport layers, antenna ports 0 and 1, and $n_{SCID} = 1$ |
| 2 | Quantity 1 of transport layers, an antenna port 1, and $n_{SCID} = 0$ | 2 | Quantity 3 of transport layers, and antenna ports 0 to 2 |
| 3 | Quantity 1 of transport layers, an antenna port 1, and $n_{SCID} = 1$ | 3 | Quantity 4 of transport layers, and antenna ports 0 to 3 |
| 4 | Quantity 2 of transport layers, and antenna ports 0 and 1 | 4 | Quantity 5 of transport layers, and antenna ports 0 and 4 |
| 5 | Quantity 3 of transport layers, and antenna ports 0 to 2 | 5 | Quantity 6 of transport layers, and antenna ports 0 to 5 |
| 6 | Quantity 4 of transport layers, and antenna ports 0 to 3 | 6 | Quantity 7 of transport layers, and antenna ports 0 to 6 |
| 7 | Reserved (reserved) | 7 | Quantity 8 of transport layers, and antenna ports 0 to 7 |

In Table 6, "Quantity of transport layers" is a quantity of transport layers supported by the user equipment. "Quantity 3 of transport layers and antenna ports 7 to 9" indicates that when the user equipment supports three transport layers in the downlink direction, the base station instructs the user equipment to use the antenna ports 7 to 9. In addition, in Table 6, in a case of one codeword, a value of a parameter $n_{SCID}$ is used to identify a same antenna port combination used by different user equipments.

The antenna port indication method generally includes: storing, by both the base station and the user equipment, a correspondence between "value" and "message" shown in Table 6; indicating, by the base station, a value corresponding to the quantity of transport layers supported by the user equipment to the user equipment; and determining, by the user equipment, based on the stored correspondence shown in Table 6, a number of an antenna port included in a message corresponding to the value, where the antenna port is an antenna port indicated by the base station to the user equipment.

It can be learned from Table 6 that the base station can provide only one or two fixed antenna port combinations for the user equipment. In this case, when the quantity of transport layers supported by the user equipment in the downlink direction is less than a quantity of antenna ports supported by the base station, some antenna ports supported by the base station cannot be indicated to the user equipment, and the antenna ports that are not indicated cannot be used by the user equipment. For example, as shown in Table 6, if there are two codewords, when the user equipment supports three transport layers in the downlink direction, an antenna port combination provided by the base station for the user equipment includes antenna ports 0 to 2. In this case, antenna ports 3 to 7 cannot be indicated to the user equipment. Therefore, a relatively small quantity of antenna ports are available to the user equipment. Consequently, each resource block can be multiplexed by a relatively small quantity of user equipments in the downlink direction, resulting in relatively low system spectrum efficiency.

To resolve the foregoing technical problems, the embodiments of the present invention provide an antenna port indication method and an apparatus. In the technical solutions provided in the embodiments of the present invention, a base station first determines a quantity N1 of transport layers supported by user equipment, and then indicates any N1 antenna ports in antenna ports supported by the base station to the user equipment. In this way, in comparison with the prior art, the base station provides a relatively large quantity of available antenna ports for the user equipment. Therefore, one resource block can be multiplexed by a plurality of user equipments in a downlink direction, so that a system has a capability of providing relatively high spectrum efficiency. It should be noted that, in specific implementation, whether one resource block can be multiplexed by a plurality of user equipments in the downlink direction is further related to a factor such as a channel condition.

The term "antenna port combination" in this application refers to a set that includes all antenna ports indicated by the base station to the user equipment. For example, in Table 6, a set that includes antenna ports represented by all numbers of antenna ports included in each message is an antenna port combination. For example, as shown in Table 6, "antenna ports 0 to 2" in "Quantity 3 of transport layers and antenna ports 0 to 2" is an antenna port combination indicated by the base station to the user equipment when the user equipment supports three transport layers in the downlink direction.

The following describes the technical solutions in the embodiments of the present invention with reference to the accompanying drawings in the embodiments of the present invention.

Figure 14:
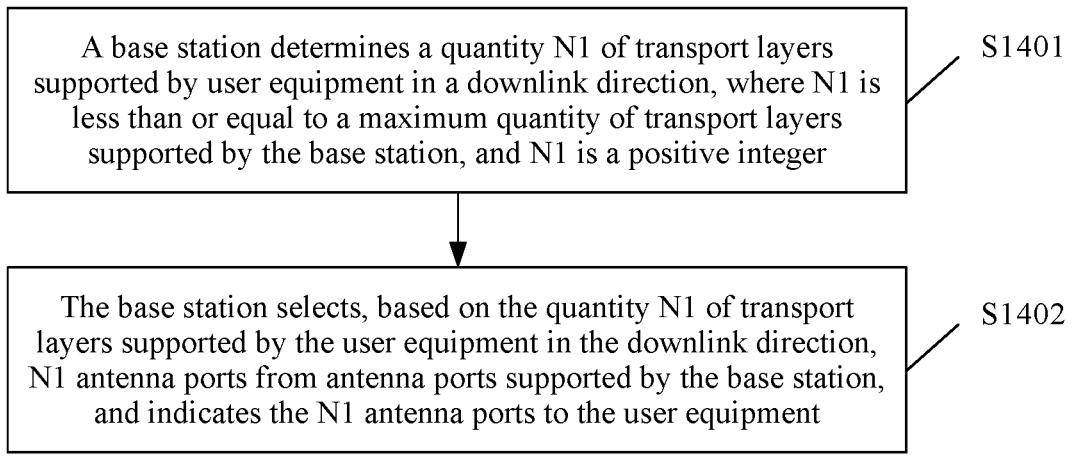
FIG. 14 is a schematic interaction diagram of another antenna port indication method according to an embodiment of the present invention.

As shown in FIG. 14, FIG. 14 is a schematic interaction diagram of an antenna port indication method according to an embodiment of the present invention. The method shown in FIG. 14 includes the following steps: S1401 and S1402.

S1401. A base station determines a quantity N1 of transport layers supported by user equipment in a downlink direction, where N1 is less than or equal to a maximum quantity of transport layers supported by the base station, and N1 is a positive integer.

In S1401, the user equipment may be any user equipment connected to the base station, namely, any user equipment served by the base station. In specific implementation, the base station may determine, by using a precoding matrix indicator (PMI) or a rank indication (RI) reported by the user equipment, the quantity N1 of transport layers supported by the user equipment in the downlink direction, or determine, through active measurement, the quantity N1 of transport layers supported by the user equipment in the downlink direction.

The base station usually supports a maximum of 2n transport layers, where n is an integer greater than or equal to 0. A maximum quantity of transport layers supported by the base station is usually four, eight, sixteen, or the like. Quantities of transport layers supported by different user equipments served by one base station in the downlink direction may be the same or different, but are less than or equal to the maximum quantity of transport layers supported by the base station.

S1402. The base station selects, based on the quantity N1 of transport layers supported by the user equipment in the downlink direction, N1 antenna ports from antenna ports supported by the base station, and indicates the N1 antenna ports to the user equipment.

If the base station supports a maximum of M layers, and M is an integer greater than or equal to N1, the base station can theoretically provide $C_M^{N1}$ antenna port combinations for the user equipment, and an antenna port combination $C_M^{N1}$ represents a combination of N1 elements selected from M elements. In the method shown in FIG. 14, for example, the base station selects an antenna port combination from the M antenna port combinations, and then indicates the selected antenna port combination to the user equipment.

In the technical solution provided in this embodiment of the present invention, the user equipment may be any user equipment connected to the base station. Therefore, the base station may indicate a same antenna port combination or different antenna port combinations to a plurality of user equipments that support a same quantity of transport layers in the downlink direction.

According to the antenna port indication method provided in this embodiment of the present invention, the base station first determines the quantity N1 of transport layers supported by the user equipment, and then indicates any N1 antenna ports in the antenna ports supported by the base station to the user equipment. In this way, in comparison with the prior art in which when the user equipment supports a plurality of transport layers, the base station can provide only one fixed antenna port combination for the user equipment, in the technical solution provided in this embodiment of the present invention, the base station can provide, for the user equipment, any N1 antenna ports in the antenna ports supported by the base station. In other words, the base station provides a relatively large quantity of available antenna ports for the user equipment. In this way, one resource block can be multiplexed by a plurality of user equipments in the downlink direction, so that a system has a capability of providing relatively high spectrum efficiency.

In an optional implementation, step S1402 may include: selecting, by the base station, as a target antenna port combination, an antenna port combination corresponding to the quantity N1 of transport layers from a preset set based on the quantity N1 of transport layers supported by the user equipment in the downlink direction; and indicating the target antenna port combination to the user equipment. Each antenna port combination corresponding to the quantity N1 of transport layers includes N1 antenna ports, and the preset set is a set that includes an antenna port combination supported by the base station and corresponding to each quantity of transport layers.

In this optional implementation, the base station selects an antenna port combination for the user equipment from the preset set each time and uses the antenna port combination as the target antenna port combination. A preset rule includes but is not limited to a rule 1 and a rule 2 shown below.

Rule 1: Any two antenna port combinations corresponding to the quantity N1 of transport layers supported by the user equipment in the downlink direction include different antenna ports. In this case, a plurality of user equipments served by the base station can actually use a relatively large quantity of antenna ports, thereby improving system spectrum efficiency. For example, if the base station supports eight antenna ports and supports a maximum of eight transport layers, and N1=4, four of the eight antenna ports may be used as an antenna port combination 1, and the rest four antenna ports may be used as an antenna port combination 2. When UE 1 and UE 2 each support four transport layers in a downlink direction, the base station may indicate the antenna port combination 1 to the UE 1, and indicate the antenna port combination 2 to the UE 2. In this way, the UE 1 and the UE 2 actually use a relatively large quantity of antenna ports, thereby effectively improving system spectrum efficiency.

Rule 2: Different antenna port combinations corresponding to the quantity N1 of transport layers supported by the user equipment in the downlink direction include some same antenna ports. In this case, the user equipment served by the base station can select a relatively large quantity of antenna port combinations, so that the base station provides a relatively large quantity of available antenna ports for the user equipment, thereby improving system spectrum efficiency.

According to the rule 1, in an optional implementation, the method may further include: classifying, by the base station, every N1 antenna ports into one antenna port combination in a sequence of numbers of the antenna ports supported by the base station. Specifically, when a quantity M of antenna ports supported by the base station is an integer multiple of N1, a quantity of antenna port combinations corresponding to the quantity N1 of transport layers supported by the user equipment in the downlink direction is a value obtained by dividing M by N1. When a quantity M of antenna ports supported by the base station is not an integer multiple of N1, a quantity of antenna port combinations corresponding to the quantity N1 of transport layers supported by the user equipment in the downlink direction is a value obtained after a value obtained by dividing M by N1 is rounded.

In addition, when the quantity M of antenna ports supported by the base station is not an integer multiple of N1, the method may further include: first determining a remainder obtained after M is divided by N1, then removing antenna ports of a quantity that is the same as the remainder from the M antenna ports supported by the base station, and finally classifying every N1 antenna ports in antenna ports obtained after the removal into one antenna port combination in a sequence of numbers of the antenna ports. The removed antenna ports may be randomly selected antenna ports, or may be antenna ports selected according to a specific rule. Specific implementation of the rule is not limited in the method.

For example, if the antenna ports supported by the base station are numbered 0 to 15, and N1=4, the base station may classify every four antenna ports into one antenna port combination in a sequence of the numbers 0 to 15 of the antenna ports, to be specific, classify antenna ports 0 to 3, antenna ports 4 to 7, antenna ports 8 to 11, and antenna ports 12 to 15 each into one antenna port combination. For another example, if the antenna ports supported by the base station are numbered 0 to 15, and N1=5, the base station may classify every five antenna ports into one antenna port combination in a sequence of the numbers 0 to 15, to be specific, classify antenna ports 0 to 4, antenna ports 5 to 9, and antenna ports 10 to 14 each into one antenna port combination, or classify antenna ports 1 to 5, antenna ports 6 to 10, and antenna ports 11 to 15 each into one antenna port combination. Certainly, specific implementation is not limited thereto.

When the base station supports eight antenna ports and eight transport layers, a correspondence between a quantity of transport layers supported by the user equipment in the downlink direction and an antenna port combination is shown in Table 7. When the base station supports sixteen antenna ports and eight transport layers, a correspondence between a quantity of transport layers supported by the user equipment in the downlink direction and an antenna port combination is shown in Table 8.

TABLE 7

| Information bits | Quantity of transport layers | Antenna port combination |
|---|---|---|
| 00000-00111 | 1 | (0)/(1)/(2)/(3)/(4)/(5)/(6)/(7) |
| 01000-01011 | 2 | (0, 1)/(2, 3)/(4, 5)/(6, 7) |
| 01100-01101 | 3 | (0, 1, 2)/(3, 4, 5) |
| 01110-10000 | 4 | (0, 1, 2, 3)/(4, 5, 6, 7) |
| 10001 | 5 | (0, 1, 2, 3, 4) |
| 10010 | 6 | (0, 1, 2, 3, 4, 5) |
| 10011 | 7 | (0, 1, 2, 3, 4, 5, 6) |
| 10100 | 8 | (0, 1, 2, 3, 4, 5, 6, 7) |

TABLE 8

| Information bits | Quantity of transport layers | Antenna port combination |
|---|---|---|
| 000000-001111 | 1 | (0)/(1)/(2)/(3)/(4)/(5)/(6)/(7)/(8)/(9)/(10)/(11)/(12)/(13)/(14)/(15) |
| 010000-010111 | 2 | (0, 1)/(2, 3)/(4, 5)/(6, 7)/(8, 9)/(10, 11)/(12, 13)/(14, 15) |
| 011000-011100 | 3 | (0, 1, 2)/(3, 4, 5)/(6, 7, 8)/(9, 10, 11)/(12, 13, 14) |
| 011101-100000 | 4 | (0, 1, 2, 3)/(4, 5, 6, 7)/(8, 9, 10, 11)/(12, 13, 14, 15) |
| 100001-100011 | 5 | (0, 1, 2, 3, 4)/(5, 6, 7, 8, 9)/(10, 11, 12, 13, 14) |
| 100100-100101 | 6 | (0, 1, 2, 3, 4, 5)/(6, 7, 8, 9, 10, 11) |
| 100110-100111 | 7 | (0, 1, 2, 3, 4, 5, 6)/(7, 8, 9, 10, 11, 12, 13) |
| 101000-101001 | 8 | (0, 1, 2, 3, 4, 5, 6, 7)/(8, 9, 10, 11, 12, 13, 14, 15) |

Table 7 and Table 8 further include a correspondence between antenna port combinations and information bits. "Information bit" shown in Table 7 and Table 8 may be equivalent to "Value" shown in Table 6 or Table 7, and "Quantity of transport layers" and "Antenna port combination" shown in Table 7 and Table 8 may be equivalent to "Message" shown in Table 6. In Table 7 and Table 8, a numeral in brackets represents a number of an antenna port, and one antenna port combination includes antenna ports represented by all numbers of antenna ports in each pair of brackets. In Table 7 and Table 8, "Quantity of transport layers" represents a quantity of transport layers supported by the user equipment in the downlink direction; and "Information bit" is used to distinguish between different antenna port combinations. Each information bit may correspond to one antenna port combination, and different information bits may correspond to a same antenna port combination. However, different antenna port combinations correspond to different information bits. A quantity of bits occupied by each information bit may be determined in advance based on a total data amount of antenna port combinations in the preset set.

In specific implementation, the base station and the user equipment may pre-agree on a correspondence between each information bit and each antenna port combination, and a specific implementation thereof is not limited. In this case, when performing the antenna port indication method, the base station may indicate an information bit to the user equipment, and the user equipment receives the information bit, and determines, by using the pre-agreed correspondence between each information bit and each antenna port combination, an antenna port combination corresponding to the information bit.

Certainly, according to the rule 1, the base station may determine, in any other manner instead of a sequence of numbers of the antenna ports supported by the base station, each antenna port combination corresponding to the quantity N1 of transport layers supported by user equipment. For example, the base station supports eight antenna ports (marked as antenna ports 0 to 7) and supports a maximum of eight transport layers, and N1=4. In this case, antenna ports 0, 1, 5, and 7 in the eight antenna ports may be used as one antenna port combination, and antenna ports 2, 3, 4, and 6 may be used as the other antenna port combination; or antenna ports 1, 2, 3, and 4 in the eight antenna ports may be used as one antenna port combination, and antenna ports 0, 5, 6, and 7 may be used as the other antenna port combination. This is not limited in this embodiment of the present invention.

According to the rule 2, in an optional implementation, the method may further include: using, by the base station, in a sequence of numbers of the antenna ports supported by the base station, each numbered antenna port as a first antenna port in an antenna port combination corresponding to the quantity N1 of transport layers.

When the base station supports eight antenna ports and eight transport layers, a correspondence between a quantity of transport layers supported by the user equipment in the downlink direction and an antenna port combination is shown in Table 9.

TABLE 9

| Quantity of transport layers | Antenna port combination |
|---|---|
| 1 | (0)/(1)/(2)/(3)/(4)/(5)/(6)/(7) |
| 2 | (0, 1)/(1, 2)/(2, 3)/(3, 4)/(4, 5)/(5, 6)/(6, 7)/(7, 0) |
| 3 | (0, 1, 2)/(1, 2, 3)(2, 3, 4)/(3, 4, 5)/(4, 5, 6)/(5, 6, 7)/(6, 7, 0)/(7, 0, 1) |
| 4 | (0, 1, 2, 3)/(1, 2, 3, 4)/(2, 3, 4, 5)/(3, 4, 5, 6)/(4, 5, 6, 7)/(5, 6, 7, 0)/(6, 7, 0, 1)/(7, 0, 1, 2) |
| 5 | (0, 1, 2, 3, 4)/(1, 2, 3, 4, 5)/(2, 3, 4, 5, 6)/(3, 4, 5, 6, 7)/(4, 5, 6, 7, 0)/(5, 6, 7, 0, 1)/(6, 7, 0, 1, 2)/(7, 0, 1, 2, 3) |
| 6 | (0, 1, 2, 3, 4, 5)/(1, 2, 3, 4, 5, 6)/(2, 3, 4, 5, 6, 7)/(3, 4, 5, 6, 7, 0)/(4, 5, 6, 7, 0, 1)/ (5, 6, 7, 0, 1, 2)/(6, 7, 0, 1, 2, 3)/(7, 0, 1, 2, 3, 4) |
| 7 | (0, 1, 2, 3, 4, 5, 6)/(1, 2, 3, 4, 5, 6, 7)/(2, 3, 4, 5, 6, 7, 0)/(3, 4, 5, 6, 7, 0, 1)/(4, 5, 6, 7, 0, 1, 2)/(5, 6, 7, 0, 1, 2, 3)/(6, 7, 0, 1, 2, 3, 4)/(7, 0, 1, 2, 3, 4, 5) |
| 8 | (0, 1, 2, 3, 4, 5, 6, 7)/(1, 2, 3, 4, 5, 6, 7, 0)/(2, 3, 4, 5, 6, 7, 0, 1)/(3, 4, 5, 6, 7, 0, 1, 2)/(4, 5, 6, 7, 0, 1, 2, 3)/ (5, 6, 7, 0, 1, 2, 3, 4)/(6, 7, 0, 1, 2, 3, 4, 5)/(7, 0, 1, 2, 3, 4, 5, 6) |

For explanation of related content (for example, brackets, a numeral in brackets, a quantity of transport layers, or the like) in Table 9, refer to the foregoing explanation of related content in Table 7 and Table 8.

As shown in Table 9, in this optional implementation, an antenna port combination corresponding to each quantity of transport layers includes all the antenna ports supported by the base station. In this case, the antenna ports supported by the base station may be antenna ports available to the user equipment, thereby improving system spectrum efficiency.

In comparison with Table 7 or Table 8, Table 9 does not include an information bit. In specific implementation, a corresponding information bit may be set for each antenna port combination in Table 9 in a manner of representing the information bit in Table 7 or Table 8. In addition, the information bit may be represented in the following manner. Specifically, the information bit is represented by using a quantity of transport layers supported by the user equipment in the downlink direction and a number of an antenna port at a specific location in the target antenna port combination, to distinguish between different antenna port combinations. In this case, step S1402 in which the base station indicates the target antenna port combination to the user equipment may include: indicating, by the base station, to the user equipment, the quantity N1 of transport layers corresponding to the target antenna port combination and a number of an antenna port at a specific location in the target antenna port combination.

Optionally, the base station may determine the antenna port at the specific location based on a quantity of antenna ports included in the antenna port combination. Specifically, for an antenna port combination corresponding to the quantity N1 of transport layers supported by the user equipment in the downlink direction, the antenna port at the specific location may be any one of a first antenna port, a second antenna port, . . . , and an $(N1-1)^{th}$ antenna port in the antenna port combination. However, the base station and the user equipment need to pre-agree to use one fixed antenna port in these antenna ports as the antenna port at the specific location. For example, when N1=2, the antenna port at the specific location may be a first antenna port or a second antenna port. In specific implementation, the base station and the user equipment pre-agree to use the second antenna port as the antenna port at the specific location.

Preferably, the base station may not identify the antenna port at the specific location based on the quantity N1 of transport layers supported by the user equipment in the downlink direction, but uses a first antenna port in the antenna port combination as the antenna port at the specific location. Certainly, specific implementation is not limited thereto.

In specific implementation, a quantity of bits to be occupied by N1 may be determined based on a value range of N1, and a quantity of bits to be occupied by a number of the antenna port at the specific location may be determined based on a quantity of antenna ports supported by the base station. For example, based on Table 9 and the foregoing preferred implementation, because a value of N1 is any one of 1 to 8, and there are eight possibilities in total, three bits may be used to represent the quantity of bits to be occupied by N1. Because the base station supports eight antenna ports, the number of the antenna port (to be specific, the first antenna port in the antenna port combination) at the specific location has eight possibilities. Therefore, three bits may be used to represent the quantity of bits to be occupied by the number of the antenna port at the specific location.

For example, based on Table 9, when the base station needs to indicate an antenna port combination (0, 1, 2, 3, 4) to the UE, the base station may indicate 100000 to the UE, where "100" shown in first three bits indicates that the UE supports four transport layers, and "000" shown in last three bits indicates that a first antenna port in the indicated antenna port combination is numbered 0. When the base station needs to indicate an antenna port combination (5, 6, 7, 0) to the UE, the base station may indicate 100101 to the UE, where "100" shown in first three bits indicates that the UE supports four transport layers, and "101" shown in last three bits indicates that a first antenna port in the indicated antenna port combination is numbered 5.

The following describes apparatus embodiments of the present invention corresponding to the method embodiment provided in FIG. 14. It should be noted that, for explanation of related content in the following apparatus embodiments, refer to the foregoing method embodiment.

Figure 15:
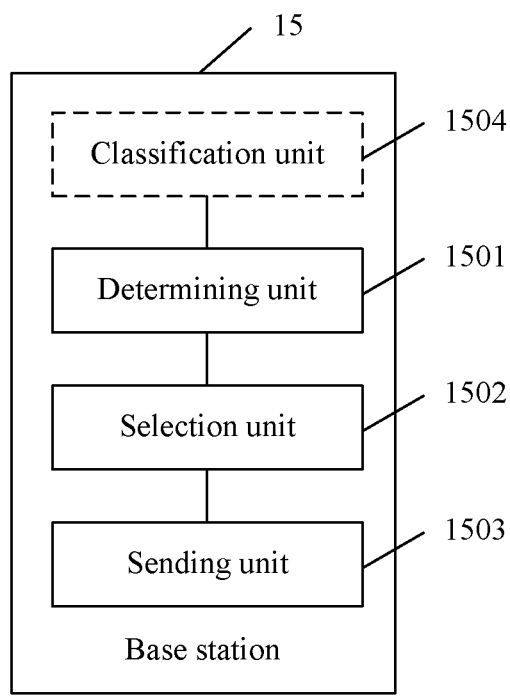
FIG. 15 is a schematic structural diagram of a base station according to an embodiment of the present invention.

As shown in FIG. 15, FIG. 15 is a schematic structural diagram of a base station 15 according to an embodiment of the present invention. The base station 15 is configured to perform the actions of the base station in the method shown in FIG. 14. The base station 15 may include:

a determining unit 1501, configured to determine a quantity N1 of transport layers supported by user equipment in a downlink direction;

a selection unit 1502, configured to select N1 antenna ports from antenna ports supported by the base station; and a sending unit 1503, configured to indicate the N1 antenna ports to the user equipment.

Optionally, the selection unit 1502 may be specifically configured to select, as a target antenna port combination, an antenna port combination corresponding to the quantity N1 of transport layers from a preset set based on the quantity N1 of transport layers supported by the user equipment in the downlink direction. In this case, the sending unit 1503 is specifically configured to indicate the target antenna port combination to the user equipment, where each antenna port combination corresponding to the quantity N1 of transport layers includes N1 antenna ports, and the preset set is a set that includes an antenna port combination supported by the base station and corresponding to each quantity of transport layers.

Optionally, any two antenna port combinations corresponding to the quantity N1 of transport layers supported by the user equipment in the downlink direction include different antenna ports. In this optional implementation, the base station 15 may further include a classification unit 1504, configured to classify every N1 antenna ports into one antenna port combination in a sequence of numbers of the antenna ports supported by the base station.

Optionally, different antenna port combinations corresponding to the quantity N1 of transport layers supported by the user equipment in the downlink direction include some same antenna ports. In this optional implementation, the base station 15 may further include a classification unit 1504, configured to use, in a sequence of numbers of the antenna ports supported by the base station, each numbered antenna port as a first antenna port in an antenna port combination corresponding to the quantity N1 of transport layers supported by the user equipment in the downlink direction. For example, the sending unit 1503 may be specifically configured to indicate, to the user equipment, the quantity N1 of transport layers corresponding to the target antenna port combination and a number of an antenna port at a specific location in the target antenna port combination.

In hardware implementation, the sending unit 1503 may be a transmitter. In specific implementation, the base station 15 may further include a receiver. The transmitter and the receiver may be integrated together to form a transceiver. The determining unit 1501, the selection unit 1502, and the classification unit 1504 may be built in or independent of a processor of the base station 15 in a hardware form, or may be stored in a software form in a memory of the base station 15, so that the processor performs an operation corresponding to each of the foregoing modules.

Figure 16:
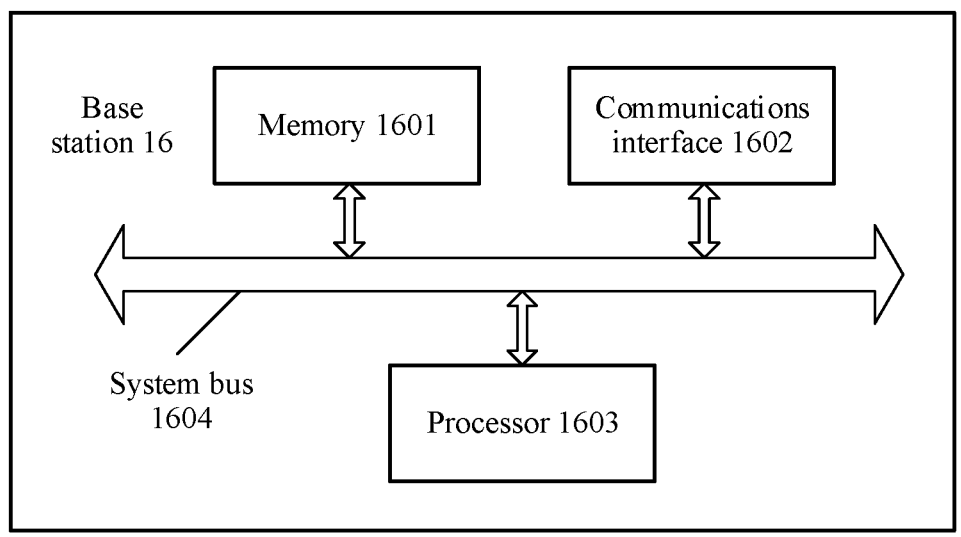
FIG. 16 is a schematic structural diagram of another base station according to an embodiment of the present invention.

As shown in FIG. 16, FIG. 16 is a schematic structural diagram of a base station 16 according to an embodiment of the present invention. The base station 16 is configured to perform the actions of the base station in any one of the methods provided in FIG. 14. The base station 16 includes a memory 1601, a communications interface 1602, a processor 1603, and a system bus 1604. The communications interface 1602 and the processor 1603 are connected by using the system bus 1604.

The memory 1601 is configured to store a computer executable instruction. When the base station 16 runs, the processor 1603 executes the computer executable instruction stored in the memory 1601, so that the base station 16 performs the actions of the base station in the embodiment provided in FIG. 14. Specifically, for the actions performed by the base station, refer to the foregoing related description, and details are not described herein again.

In a specific implementation process, each step in the method procedure shown in FIG. 14 may be implemented in a manner in which the processor 1603 in a hardware form executes the computer executable instruction in a software form that is stored in the memory 1601. To avoid repetition, details are not described herein again.

This embodiment further provides a storage medium, and the storage medium may include the memory 1601.

The base station 15 and the base station 16 provided in the embodiments of the present invention may be configured to perform the actions performed by the base station in the schematic interaction diagram of the method shown in FIG. 14. Therefore, for technical effects that can be achieved by the base station 15 and the base station 16, refer to the foregoing method embodiment, and details are not described herein again.

It should be noted that a processor of any base station or user equipment provided above may be one processor, or may be a collective term of a plurality of processing elements. For example, the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor. Alternatively, the processor may be any conventional processor or the like, or may be a dedicated processor. The dedicated processor may include at least one of a baseband processing chip, a radio frequency processing chip, and the like. Further, the dedicated processor may include a chip with another dedicated processing function in a device (for example, a base station or user equipment) in which the processor is located.

A memory of any base station or user equipment provided above may include a volatile memory, for example, a random-access memory (RAM); may include a non-volatile memory, for example, a read-only memory (ROM), a flash memory, a hard disk drive (HDD), or a solid state drive (SSD); or may include a combination of the foregoing types of memories.

A system bus of any base station or user equipment provided above may include a data bus, a power bus, a control bus, a signal status bus, and the like. In this embodiment, for clarity of description, various buses are marked as the system bus.

A communications interface of any base station or user equipment provided above may be specifically a transceiver. The transceiver may be a wireless transceiver. For example, the wireless transceiver may be an antenna or the like. The processor communicates with another device by using the communications interface.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, a network device, or the like) to perform some of the steps of the methods described in the embodiments of the present invention.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A communication method comprising:
receiving, by a terminal from a base station, information indicating an antenna port set of pilots used for data demodulation, wherein the pilots comprise a pilot for the terminal and a pilot for another terminal;
determining, by the terminal and according to the received information, a ratio of energy per resource element (EPRE) of a physical downlink shared channel (PDSCH) to EPRE of a demodulation reference signal (DMRS) of the PDSCH;

determining, by the terminal, the antenna port set based on the received information, wherein a pilot location for the antenna port set is not used for data transmission;

determining, by the terminal, an unused pilot location other than the pilot location according to a pilot pattern, wherein the pilot pattern is associated with a quantity of antenna ports supported by the base station; and receiving, by the terminal, data at the unused pilot location.

2. The method according to claim 1, wherein the information comprises an identity of the antenna port set of the pilots.

3. The method according to claim 1, wherein the antenna port set comprises resources corresponding to the antenna port set.

4. The method according to claim 1, wherein the information is received through downlink control information (DCI).

5. The method according to claim 4, wherein a field in the DCI implicitly indicates the information.

6. The method according to claim 1, further comprising:
transmitting, by the terminal, data to the base station at a pilot location corresponding to an antenna port other than any antenna port included in the antenna port set.

7. The method according to claim 6, wherein the data transmitted by the terminal does not occupy a resource corresponding to an antenna port that is used by the another terminal and that is in the antenna port set.

8. The method according to claim 1, further comprising:
receiving, by the terminal, pilots at all pilot locations corresponding to all antenna ports in the antenna port set, wherein the pilots have total power for the antenna port set.

9. The method according to claim 1, including receiving, by the terminal, the DMRS on one or more antenna ports in the antenna port set.

10. A communication apparatus comprising:
one or more processors; and
a storage medium coupled to the one or more processors and configured to store computer-readable instructions which, when executed by the one or more processors, cause the apparatus to:
receive, from a base station, information indicating an antenna port set of pilots used for data demodulation, wherein the pilots comprise a pilot for the communication apparatus and a pilot for another communication apparatus;
determine, according to the received information, a ratio of energy per resource element (EPRE) of a physical downlink shared channel (PDSCH) to EPRE of a demodulation reference signal (DMRS) of the PDSCH;
determine the antenna port set based on the received information, wherein a pilot location for the antenna port set is not used for data transmission;
determine an unused pilot location other than the pilot location according to a pilot pattern, wherein the pilot pattern is associated with a quantity of antenna ports supported by the base station; and
receive data at the unused pilot location.

11. The communication apparatus according to claim 10, wherein the information comprises an identity of the antenna port set of the pilots.

12. The communication apparatus according to claim 10, wherein the antenna port set comprises resources corresponding to the antenna port set.

13. The communication apparatus according to claim 10, wherein the storage medium is further configured to store computer-readable instructions which, when executed by the one or more processors, cause the apparatus to receive the DMRS on one or more antenna ports in the antenna port set.

14. A non-transitory computer readable medium, wherein the non-transitory computer readable medium stores instructions that are executable by a computer, and the instructions comprise instructions for:
receiving, from a base station, information indicating an antenna port set of pilots used for data demodulation, wherein the pilots comprise a pilot for a terminal and a pilot for another terminal;
determining, according to the information, a ratio of energy per resource element (EPRE) of a physical downlink shared channel (PDSCH) to EPRE of a demodulation reference signal (DMRS) of the PDSCH;
determining the antenna port set based on the information, wherein a pilot location for the antenna port set is not used for data transmission;
determining an unused pilot location other than the pilot location according to a pilot pattern, wherein the pilot pattern is associated with a quantity of antenna ports supported by the base station; and
receiving data at the unused pilot location.

15. The non-transitory computer readable medium according to claim 14, wherein the information comprises an identity of the antenna port set of the pilots.

16. The non-transitory computer readable medium according to claim 14, wherein the instructions further comprise instructions for receiving the DMRS on one or more antenna ports in the antenna port set.

* * * * *